US012389402B2

(12) United States Patent
Zhang et al.

(10) Patent No.: US 12,389,402 B2
(45) Date of Patent: Aug. 12, 2025

(54) SCHEDULING OPERATION WITH MODE-1 SCHEDULING IN SIDELINK AND SIDELINK UNLICENSED OPERATIONS

(71) Applicant: QUALCOMM Incorporated, San Diego, CA (US)

(72) Inventors: Xiaoxia Zhang, San Diego, CA (US); Jing Sun, San Diego, CA (US); Yisheng Xue, San Diego, CA (US); Chih-Hao Liu, San Diego, CA (US); Ozcan Ozturk, San Diego, CA (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 17/716,695

(22) Filed: Apr. 8, 2022

(65) Prior Publication Data

US 2022/0330306 A1    Oct. 13, 2022

Related U.S. Application Data

(60) Provisional application No. 63/174,003, filed on Apr. 12, 2021.

(51) Int. Cl.
*H04W 4/00* (2018.01)
*H04L 1/1867* (2023.01)
(Continued)

(52) U.S. Cl.
CPC ............. *H04W 72/20* (2023.01); *H04L 1/188* (2013.01); *H04L 5/0055* (2013.01); *H04W 72/23* (2023.01); *H04W 76/28* (2018.02)

(58) Field of Classification Search
CPC ...... H04W 72/20; H04W 76/28; H04W 72/23; H04L 1/188; H04L 5/0055
See application file for complete search history.

(56) References Cited

U.S. PATENT DOCUMENTS

2017/0078964 A1*   3/2017   Siomina ................ H04W 76/28
2020/0275474 A1*   8/2020   Chen ..................... H04L 1/1607
(Continued)

OTHER PUBLICATIONS

International Search Report and Written Opinion—PCT/US2022/071663—ISA/EPO—Jul. 27, 2022.
(Continued)

*Primary Examiner* — Abdelnabi O Musa
(74) *Attorney, Agent, or Firm* — Arun Swain

(57) ABSTRACT

Aspects described herein relate to sidelink transmissions. In an example, a first user equipment (UE) may receive, from a network entity, a first sidelink grant for a transmission between the first UE and a second UE; communicate the transmission according to the first sidelink grant to the second UE; determine initiation of a sidelink round trip timer subsequent to communicating the transmission to the second UE; and initiate an inactive mode for the first UE based on a second grant not being received from the network entity before completion of a duration of a sidelink retransmission timer that was initiated upon completion of a duration of the sidelink round trip timer, the first UE being configured out of an ON duration of a discontinuous reception (DRX) cycle, and an inactivity timer expiring before completion of the duration of the sidelink retransmission timer.

28 Claims, 17 Drawing Sheets

(51) Int. Cl.
*H04L 5/00* (2006.01)
*H04W 72/20* (2023.01)
*H04W 72/23* (2023.01)
*H04W 76/28* (2018.01)

(56) References Cited

U.S. PATENT DOCUMENTS

| | | | | |
|---|---|---|---|---|
| 2021/0227602 | A1* | 7/2021 | Li | H04W 76/14 |
| 2021/0251037 | A1* | 8/2021 | Akkarakaran | H04W 72/23 |
| 2021/0385710 | A1* | 12/2021 | Jin | H04W 36/08 |
| 2022/0295514 | A1* | 9/2022 | Shin | H04W 52/0216 |
| 2022/0330283 | A1* | 10/2022 | Park | H04W 76/28 |
| 2023/0164875 | A1* | 5/2023 | Lee | H04W 76/23 370/329 |
| 2023/0397292 | A1* | 12/2023 | Park | H04W 76/28 |
| 2024/0064855 | A1* | 2/2024 | Wu | H04W 72/25 |
| 2024/0080937 | A1* | 3/2024 | Park | H04L 1/1864 |

OTHER PUBLICATIONS

LG Electronics Inc (Rapporteur): "Report of [Post109bis-e][957][V2X]: MAC Issues (LG)", 3GPP Draft, R2-2005720, 3GPP TSG-RAN WG2 #110-e, 3rd Generation Partnership Project (3GPP), Mobile Competence Centre, 650, Route Des Lucioles, F-06921 Sophia-Antipolis Cedex, France, vol. Ran WG2, No. Online, Jun. 1, 2020-Jun. 12, 2020, May 29, 2020 (May 29, 2020), XP051892161, 97 Pages, Sections 5.7, 5.22.1.1 and 5.x.1.7.

Oppo: "Discussion on Network Involvement for SL Related DRX", 3GPP TSG-RAN WG2 #113-e, R2-2100275, 3rd Generation Partnership Project (3GPP), Mobile Competence Centre, 650, Route Des Lucioles, F-06921 Sophia-Antipolis Cedex, France, vol. RAN WG2, No. E-meeting, Jan. 1, 2021, Jan. 15, 2021, XP051973475, 4 Pages.

Vivo: "SL DRX Remaining Issues", 3GPP TSG-RAN WG2 Meeting #113-e, R2-2100795, 3rd Generation Partnership Project (3GPP), Mobile Competence Centre, 650, Route Des Lucioles, F-06921 Sophia-Antipolis Cedex, France, vol. RAN WG2, No. E-Meeting, Jan. 25, 2021-Feb. 5, 2021, Jan. 15, 2021, XP051973902, 3 Pages.

* cited by examiner

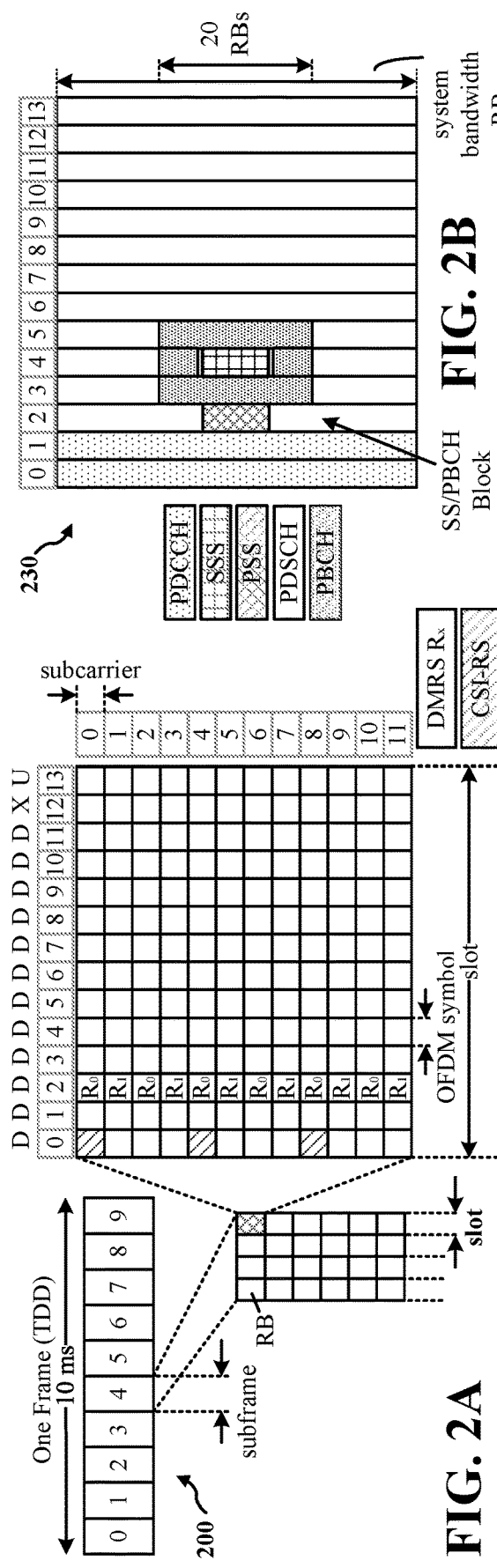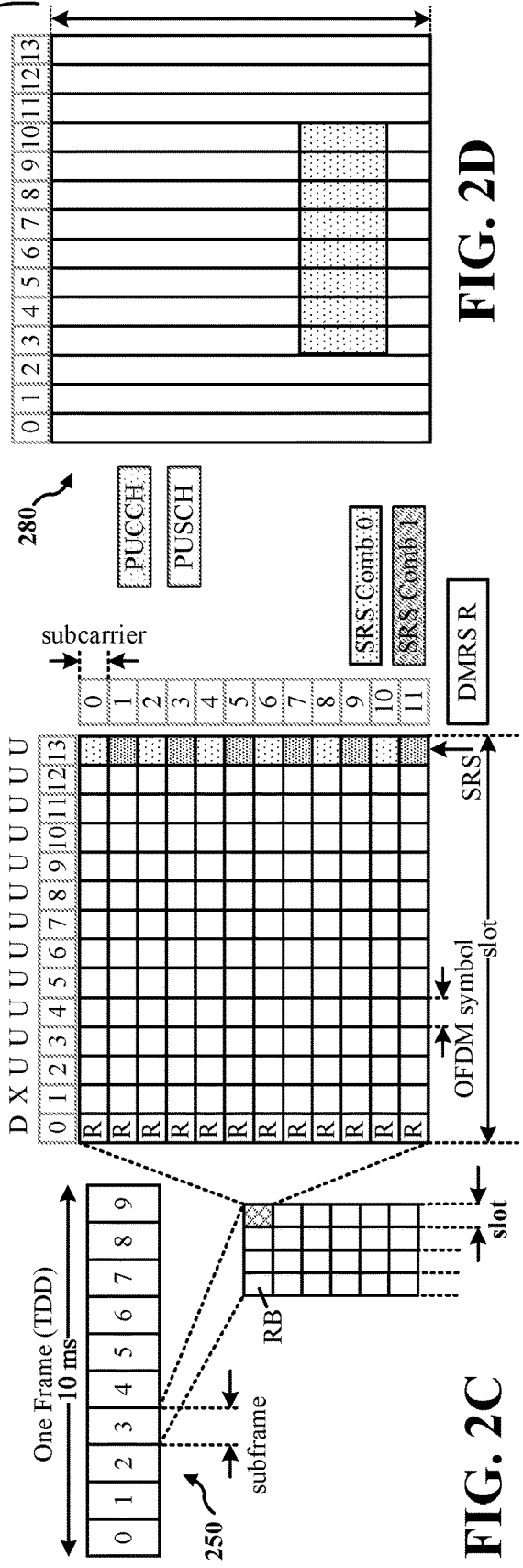

SCHEDULING OPERATION WITH MODE-1 SCHEDULING IN SIDELINK AND SIDELINK UNLICENSED OPERATIONS

CROSS-REFERENCE TO RELATED APPLICATION(S)

The present application claims benefit of U.S. Provisional Application No. 63/174,003 entitled "SCHEDULING OPERATION WITH MODE-1 SCHEDULING IN SIDE-LINK AND SIDELINK UNLICENSED OPERATIONS" filed Apr. 12, 2021, which is assigned to the assignee hereof and hereby expressly incorporated by reference herein.

TECHNICAL FIELD

Aspects of the present disclosure relate generally to wireless communication systems, and more particularly, to apparatuses and methods of discontinuous reception (DRX) for sidelink operation, where sidelink is a direct link between two devices.

INTRODUCTION

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, full duplex communication with respect to integrated access and backhaul (IAB) implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a first user equipment (UE). The method may include receiving, from a network entity, a first sidelink grant for a transmission between the first UE and a second UE; communicating the transmission according to the first sidelink grant to the second UE; determining initiation of a sidelink round trip timer subsequent to communicating the transmission to the second UE; and initiating an inactive mode for the first UE based on a second grant not being received from the network entity before completion of a duration of a sidelink retransmission timer that was initiated upon completion of a duration of the sidelink round trip timer, the first UE being configured out of an ON duration of a discontinuous reception (DRX) cycle, and an inactivity timer expiring before completion of the duration of the sidelink retransmission timer.

In a further example, an apparatus for wireless communication is provided that includes a transceiver, a memory configured to store instructions, and one or more processors communicatively coupled with the transceiver and the memory. The one or more processors are configured to execute the instructions to receive, from a network entity, a first sidelink grant for a transmission between the first UE and a second UE; communicate the transmission according to the first sidelink grant to the second UE; determine initiation of a sidelink round trip timer subsequent to communicating the transmission to the second UE; and initiate an inactive mode for the first UE based on a second grant not being received from the network entity before completion of a duration of a sidelink retransmission timer that was initiated upon completion of a duration of the sidelink round trip timer, the first UE being configured out of an ON duration of a DRX cycle, and an inactivity timer expiring before completion of the duration of the sidelink retransmission timer.

In another aspect, an apparatus for wireless communication is provided that includes means for receiving, from a network entity, a first sidelink grant for a transmission between the first UE and a second UE; means for communicating the transmission according to the first sidelink grant to the second UE; means for determining initiation of a sidelink round trip timer subsequent to communicating the transmission to the second UE; and means for initiating an inactive mode for the first UE based on a second grant not being received from the network entity before completion of a duration of a sidelink retransmission timer that was initiated upon completion of a duration of the sidelink round trip timer, the first UE being configured out of an ON duration of a DRX cycle, and an inactivity timer expiring before completion of the duration of the sidelink retransmission timer.

In yet another aspect, a non-transitory computer-readable medium is provided including code executable by one or more processors to receive, from a network entity, a first sidelink grant for a transmission between the first UE and a second UE; communicate the transmission according to the first sidelink grant to the second UE; determine initiation of a sidelink round trip timer subsequent to communicating the transmission to the second UE; and initiate an inactive mode for the first UE based on a second grant not being received from the network entity before completion of a duration of a sidelink retransmission timer that was initiated upon completion of a duration of the sidelink round trip timer, the first UE being configured out of an ON duration of a DRX cycle, and an inactivity timer expiring before completion of the duration of the sidelink retransmission timer.

In another aspect, the disclosure provides a method of wireless communication for a first UE. The method may include receiving, from a network entity, a first sidelink grant for a transmission between the first UE and a second UE; communicating the transmission according to the first sidelink grant to the second UE; determining initiation of a sidelink retransmission timer subsequent to communicating the transmission to the second UE; and initiating an inactive mode for the first UE based on a second grant not being received from the network entity before completion of a duration of the sidelink retransmission timer.

In a further example, an apparatus for wireless communication is provided that includes a transceiver, a memory configured to store instructions, and one or more processors communicatively coupled with the transceiver and the memory. The one or more processors are configured to execute the instructions to receive, from a network entity, a first sidelink grant for a transmission between the first UE and a second UE; communicate the transmission according to the first sidelink grant to the second UE; determine initiation of a sidelink retransmission timer subsequent to communicating the transmission to the second UE; and initiate an inactive mode for the first UE based on a second grant not being received from the network entity before completion of a duration of the sidelink retransmission timer.

In another aspect, an apparatus for wireless communication is provided that includes means for receiving, from a network entity, a first sidelink grant for a transmission between the first UE and a second UE; communicating the transmission according to the first sidelink grant to the second UE; determining initiation of a sidelink retransmission timer subsequent to communicating the transmission to the second UE; and initiating an inactive mode for the first UE based on a second grant not being received from the network entity before completion of a duration of the sidelink retransmission timer.

In yet another aspect, a non-transitory computer-readable medium is provided including code executable by one or more processors to receive, from a network entity, a first sidelink grant for a transmission between the first UE and a second UE; communicate the transmission according to the first sidelink grant to the second UE; determine initiation of a sidelink retransmission timer subsequent to communicating the transmission to the second UE; and initiate an inactive mode for the first UE based on a second grant not being received from the network entity before completion of a duration of the sidelink retransmission timer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 2A is a diagram illustrating an example of a first 5G NR frame, in accordance with various aspects of the present disclosure;

FIG. 2B is a diagram illustrating an example of DL channels within a 5G NR subframe, in accordance with various aspects of the present disclosure;

FIG. 2C is a diagram illustrating an example of a second 5G NR frame, in accordance with various aspects of the present disclosure;

FIG. 2D is a diagram illustrating an example of UL channels within a 5G NR subframe, in accordance with various aspects of the present disclosure, in accordance with various aspects of the present disclosure;

DETAILED DESCRIPTION

Figure 1:
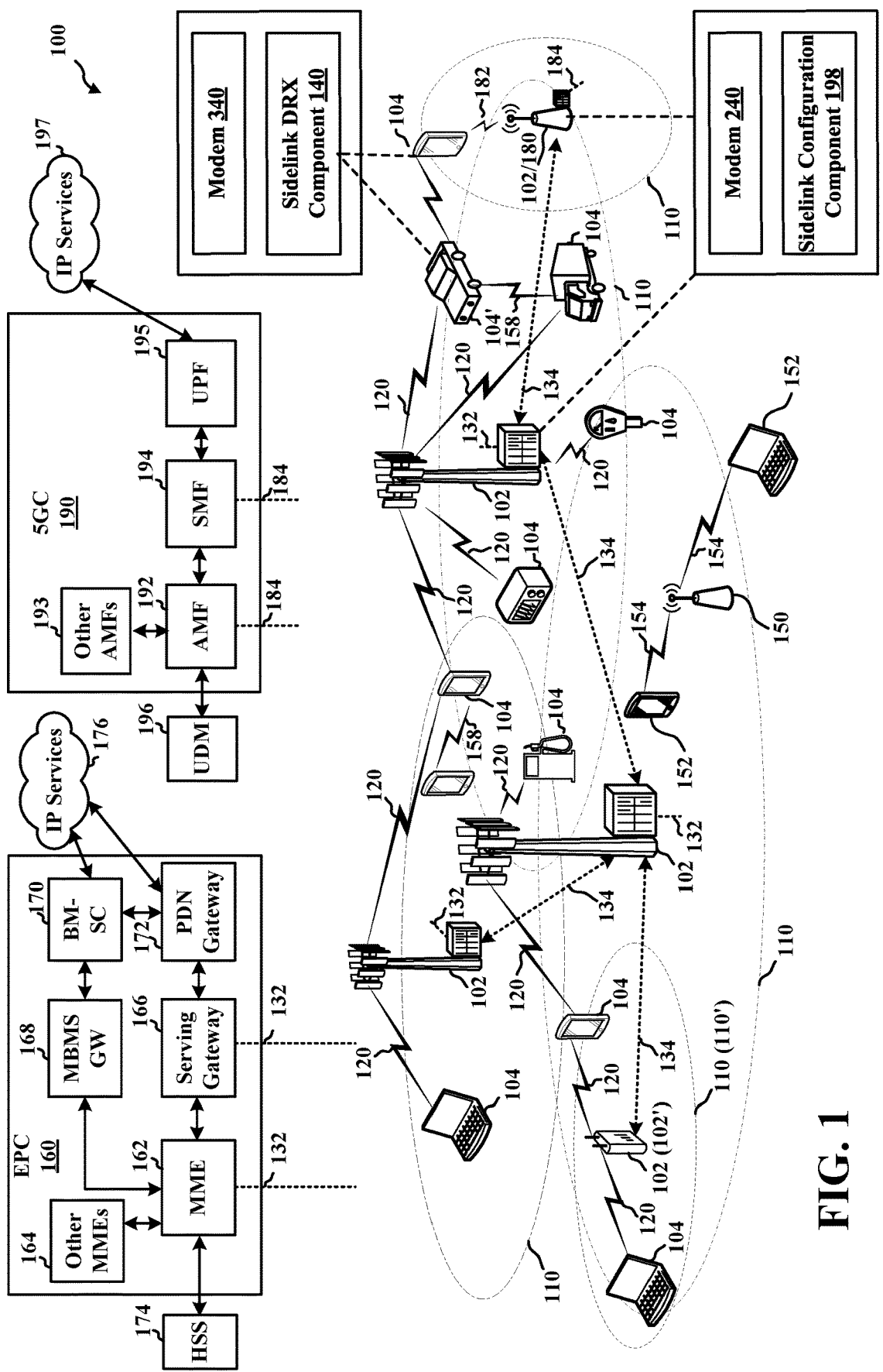
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to sidelink communications. A user equipment (UE) in communication with another device (e.g., a base station) may actively monitor a control channel (e.g., a physical downlink control channel (PDCCH)) for a grant scheduling a transmission. When the UE is not actively receiving data, the UE may conserve power by entering a discontinuous reception mode (DRX) in which the UE monitors the control channel during an active time and an on duration of a DRX cycle and may sleep during an off portion of the DRX cycle. That is, the UE may not monitor the control channel during the off portion of the DRX cycle and a base station may avoid transmitting the control channel to the UE during the off portion of the DRX cycle.

The described features generally relate to synchronization signals for direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

A UE may be configured for mode 1 sidelink scheduling in which the base station (e.g., gNB) may be responsible for scheduling sidelink transmissions between UEs. The base station may transmit a grant (e.g., downlink control information (DCI)) on a physical downlink control channel (PDCCH) to a transmitting UE and/or the receiving UE. The transmitting UE may transmit a physical sidelink control channel (PSCCH) to provide additional information about the transmission (e.g., modulation and coding scheme (MCS)). Hybrid automatic repeat request (HARQ) acknowledgments for sidelink communications may be transmitted either via the Uu link to the base station or via the sidelink (e.g., on a physical sidelink feedback channel (PSFCH). Due to the differences between Uu link and sidelink communications, DRX procedures for the Uu link may not be sufficient for the sidelink with mode 1 scheduling.

Hence, the present disclosure provides for DRX configuration and procedures for sidelink communications using mode 1 scheduling. As such, the present implementations provide for receiving, from a network entity, a first sidelink grant for a transmission between the first UE and a second UE; communicating the transmission according to the first sidelink grant to the second UE; determining initiation of a sidelink round trip timer subsequent to communicating the transmission to the second UE; and initiating an inactive mode for the first UE based on a second grant not being received from the network entity before completion of a duration of a sidelink retransmission timer that was initiated upon completion of a duration of the sidelink round trip timer, the first UE being configured out of an ON duration of a DRX cycle, and an inactivity timer expiring before completion of the duration of the sidelink retransmission timer.

Additionally, a first UE may receive, from a network entity, a first sidelink grant for a transmission between the first UE and a second UE; communicate the transmission according to the first sidelink grant to the second UE; determine initiation of a sidelink retransmission timer subsequent to communicating the transmission to the second UE; and initiate an inactive mode for the first UE based on a second grant not being received from the network entity before completion of a duration of the sidelink retransmission timer.

The described features will be presented in more detail below with reference to FIGS. 1-17.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as a network entity, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and sidelink configuration component 198 that is configured to transmit the first sidelink grant for mode 1 scheduling, as described herein. Though a base station 102/gNB 180 is shown as having the modem 240 and sidelink configuration component 198, this is one illustrative example, and substantially any node or type of node may include a modem 240 and sidelink configuration component 198 for providing corresponding functionalities described herein.

In some examples, the UE 104 may have a modem 340 and sidelink DRX component 140 that controls discontinuous reception for sidelink communications. The sidelink DRX component 140 may be configured to receive, from a base station, a first sidelink grant for a transmission between the UE and a second UE, communicate the transmission according to the sidelink grant, monitor a configured duration of a sidelink round trip time timer from the transmission and monitors a configured duration of a sidelink retransmission timer from an end of the sidelink round trip time timer, and allow a start of an inactive mode after the duration of the sidelink retransmission timer if a second grant is not received during the sidelink retransmission timer. For example, in active mode, UE 104 monitors the PDCCH, while in inactive mode, UE 104 does not monitor the PDCCH.

In an aspect, when DRX cycle is configured for UE 104, there is a duration for "ON" followed by a duration for "OFF". The DRX ON duration corresponds to the duration of "ON". For example, an inactivity timer is initiated when UE 104 receives an PDCCH for initial transmission (e.g., on either DL or UL). UE 104 is configured with DRX cycle. When the ON duration starts, UE 104 starts to monitor PDCCH. If UE 104 receives a PDCCH for initial transmission, UE 104 starts the inactivity timer. After UE 104 transmits a feedback signal, UE 104 starts the RTT timer. When the RTT timer expires, UE 104 starts the retransmission timer. UE 104 is required to monitor PDCCH as long as one of the conditions is satisfied (i.e., active mode): UE 104 is still in the ON duration period, inactivity timer is still running, or retransmission timer is still running. UE 104 may initiate an inactive mode upon expiration of the durations of the inactivity timer, RTT timer, and retransmission timer.

In some examples, the UE 104 and/or sidelink DRX component 140 may be configured to receive, from a base station 102, a first sidelink grant for a transmission between the first UE 104 and a second UE 104'; communicate the transmission according to the first sidelink grant to the second UE 104'; determine initiation of a sidelink round trip timer subsequent to communicating the transmission to the second UE 104'; and initiate an inactive mode for the first UE 104 based on a second grant not being received from the network entity 102 before completion of a duration of a sidelink retransmission timer that was initiated upon completion of a duration of the sidelink round trip timer, the first UE 104 being configured out of an ON duration of a DRX cycle, and an inactivity timer expiring before completion of the duration of the sidelink retransmission timer.

In some examples, UE 104 and/or sidelink DRX component 140 may be configured to receive, from a base station 102, a first sidelink grant for a transmission between the first UE 104 and a second UE 104'; communicate the transmission according to the first sidelink grant to the second UE 104'; determine initiation of a sidelink retransmission timer subsequent to communicating the transmission to the second UE 104'; and initiate an inactive mode for the first UE 104 based on a second grant not being received from the network entity 102 before completion of a duration of the sidelink retransmission timer.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a AMF 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 14:
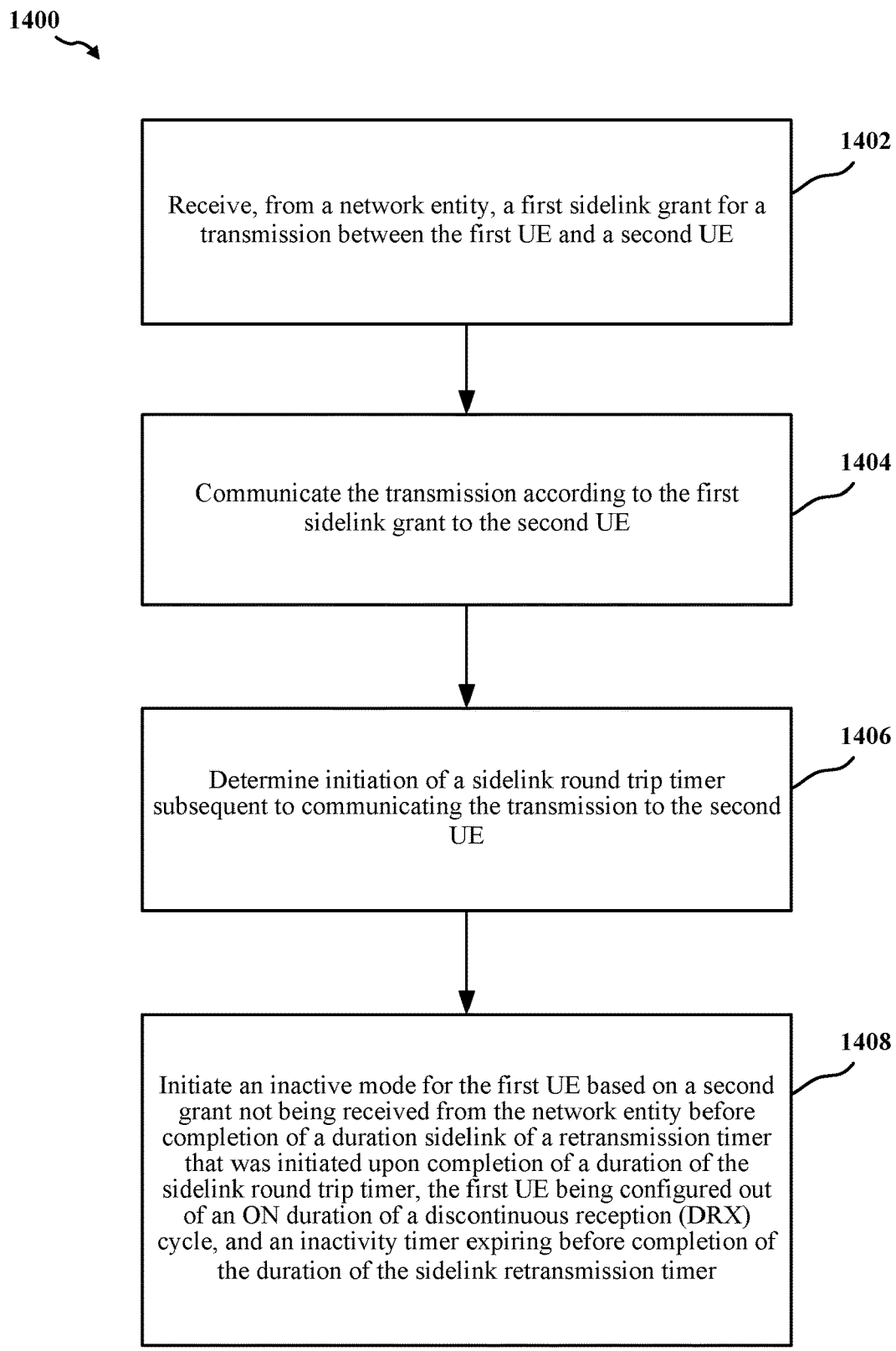
FIG. 14 is a flow chart illustrating an example of a method for wireless communications at a first UE in accordance with various aspects of the present disclosure.
Figure 15:
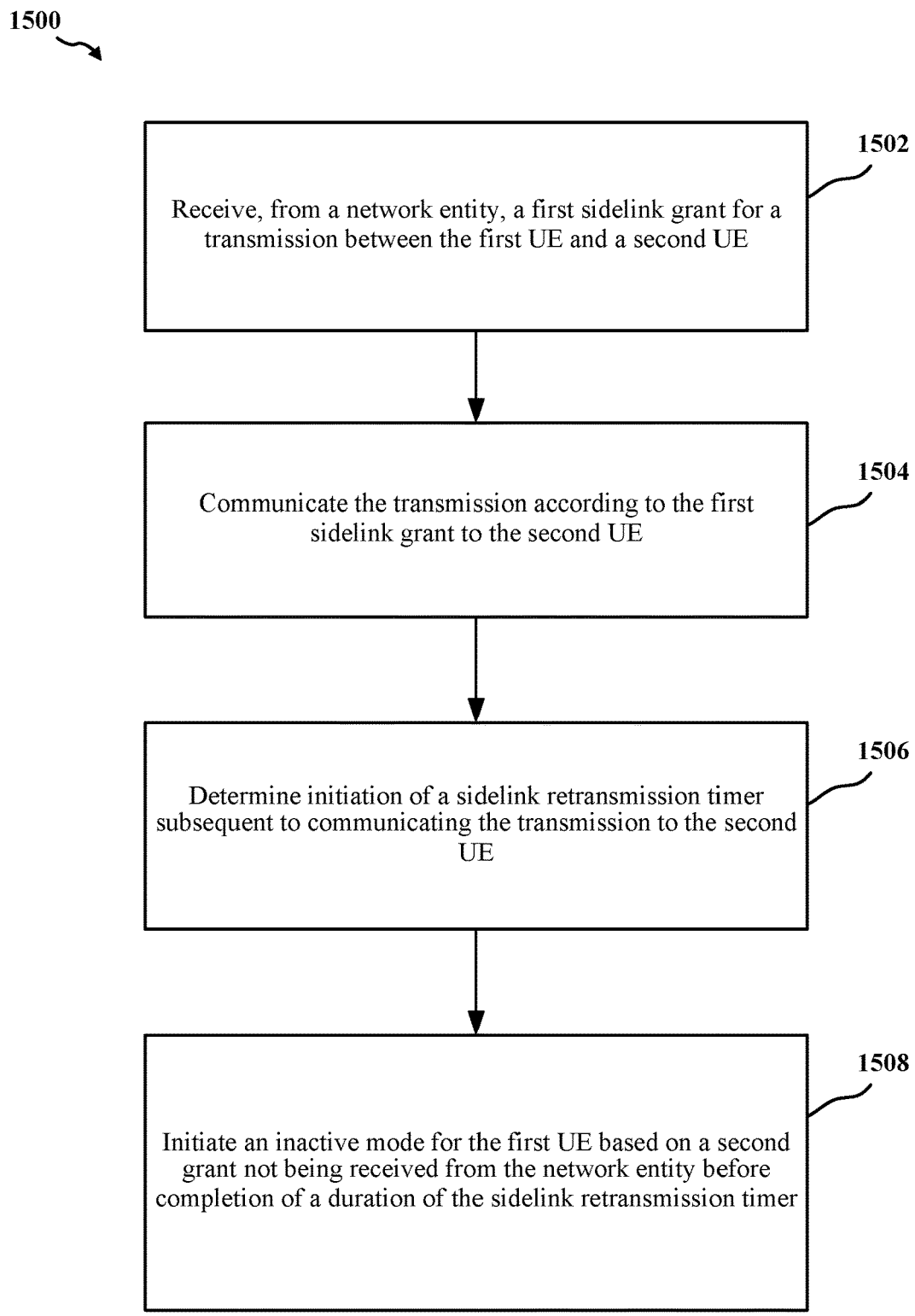
FIG. 15 is a flow chart illustrating another example of a method for wireless communications at a first UE in accordance with various aspects of the present disclosure.

Turning now to FIGS. 2-17, aspects are depicted with reference to one or more components and one or more methods that may perform the actions or operations described herein, where aspects in dashed line may be optional. Although the operations described below in FIGS. 14 and 15 are presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
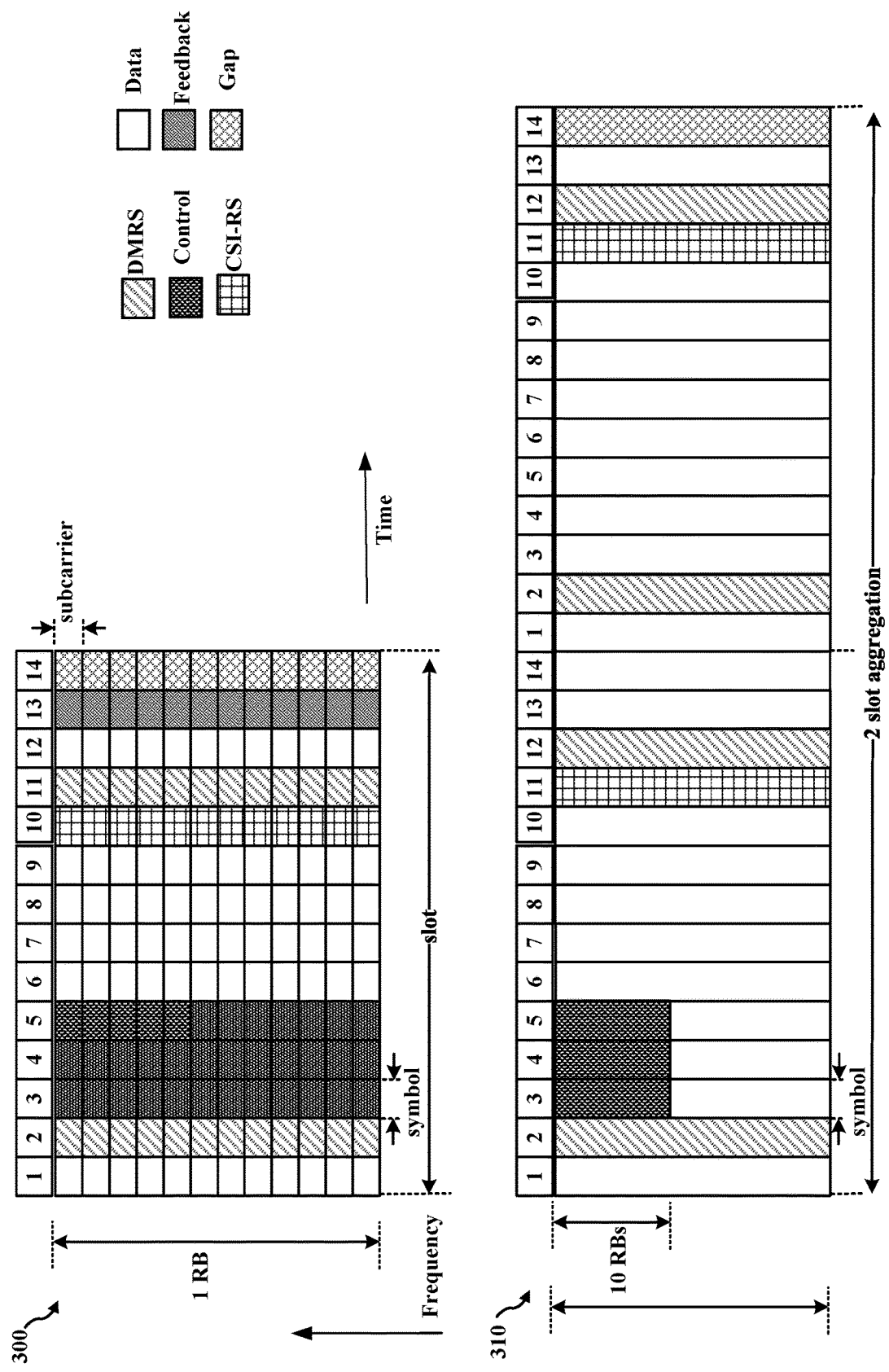
FIG. 3 illustrates example aspects of a sidelink slot structure, in accordance with various aspects of the present disclosure.

FIG. 3 illustrates example diagrams 300 and 310 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 3 symbols. Each slot may include 7 or 14 symbols, depending on the slot configuration. For slot configuration 0, each slot may include 14 symbols, and for slot configuration 1, each slot may include 7 symbols. Diagram 300 illustrates a single slot transmission, e.g., which may correspond to a 0.5 ms transmission time interval (TTI). Diagram 310 illustrates an example two-slot aggregation, e.g., an aggregation of two 0.5 ms TTIs. Diagram 300 illustrates a single RB, whereas diagram 310 illustrates N RBs. In diagram 310, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may comprise control information, e.g., along with demodulation RS (DMRS). FIG. 3 also illustrates that symbol(s) may comprise CSI-RS. The symbols in FIG. 3 that are indicated for DMRS or CSI-RS indicate that the symbol comprises DMRS or CSI-RS REs. Such symbols may also comprise REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 3, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots. The control information may comprise Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may comprise the data message described herein. The position of any of the SCI, feedback, and LBT symbols may be different than the example illustrated in FIG. 3. Multiple slots may be aggregated together. FIG. 3 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 4:
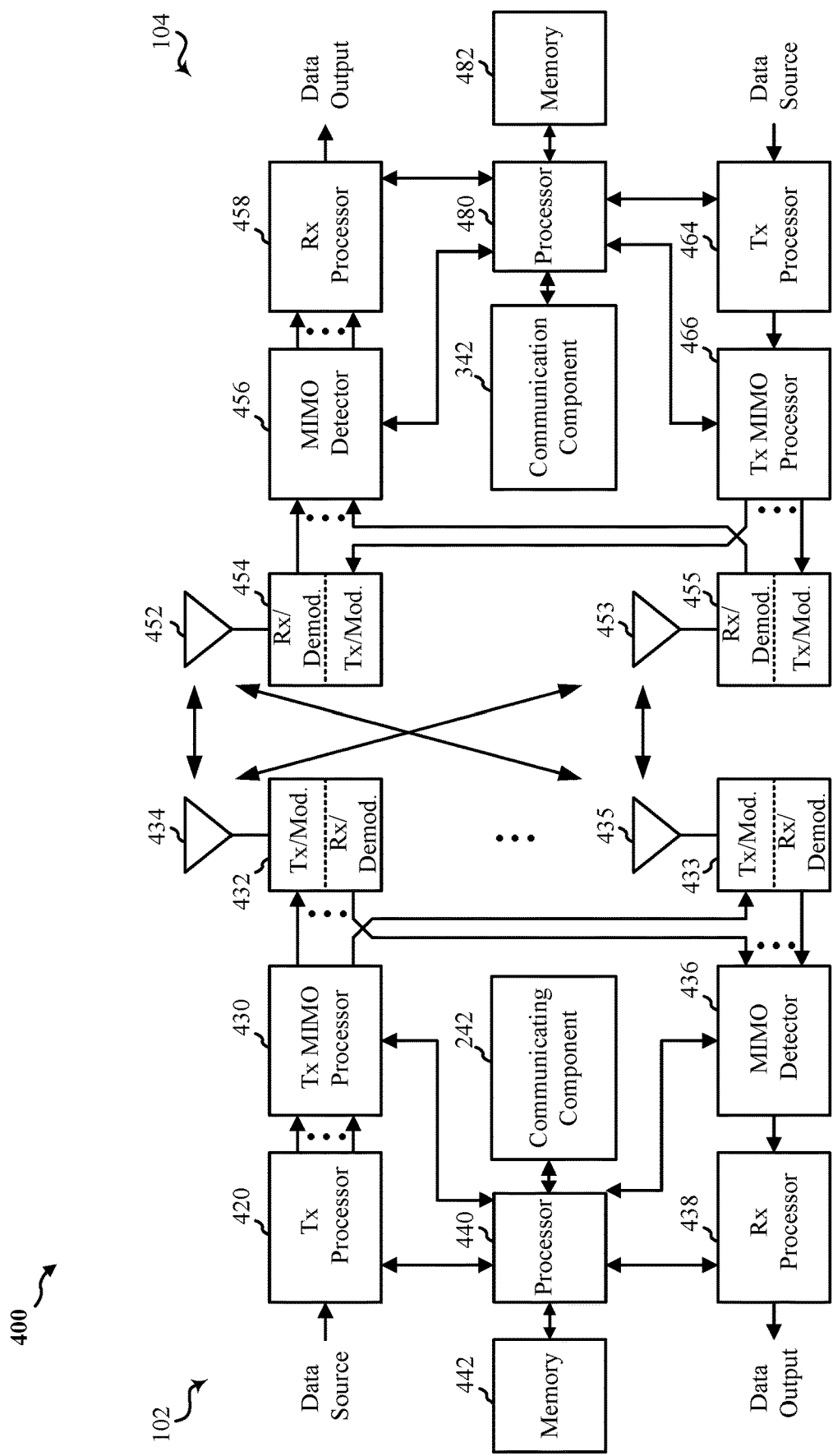
FIG. 4 is a block diagram illustrating an example of a MIMO communication system including a base station and a user equipment (UE), in accordance with various aspects of the present disclosure.

FIG. 4 is a block diagram of a MIMO communication system 400 including a base station 102, and a UE 104. The MIMO communication system 400 may illustrate aspects of the wireless communication access network 100 described with reference to FIG. 1. The base station 102 may be an example of aspects of the base station 102 described with reference to FIG. 1. The base station 102 may be equipped with antennas 434 and 435, and the UE 104 may be equipped with antennas 452 and 453. In the MIMO communication system 400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 420 may receive data from a data source. The transmit processor 420 may process the data. The transmit processor 420 may also generate control symbols or reference symbols. A transmit MIMO processor 430 may perform spatial processing (e.g., precoding) on data symbols, control symbols, or reference symbols, if applicable, and may provide output symbol streams to the transmit modulator/demodulators 432 and 433. Each modulator/demodulator 432 through 433 may process a respective output symbol stream (e.g., for OFDM, etc.) to obtain an output sample stream. Each modulator/demodulator 432 through 433 may further process (e.g., convert to analog, amplify, filter, and upconvert) the output sample stream to obtain a DL signal. In one example, DL signals from modulator/demodulators 432 and 433 may be transmitted via the antennas 434 and 435, respectively.

The UE 104 may be an example of aspects of the UEs 104 described with reference to FIGS. 1 and 17. At the UE 104, the UE antennas 452 and 453 may receive the DL signals from the base station 102 and may provide the received signals to the modulator/demodulators 454 and 455, respectively. Each modulator/demodulator 454 through 455 may condition (e.g., filter, amplify, downconvert, and digitize) a respective received signal to obtain input samples. Each modulator/demodulator 454 through 455 may further process the input samples (e.g., for OFDM, etc.) to obtain received symbols. A MIMO detector 456 may obtain received symbols from the modulator/demodulators 454 and 455, perform MIMO detection on the received symbols, if applicable, and provide detected symbols. A receive (Rx) processor 458 may process (e.g., demodulate, deinterleave, and decode) the detected symbols, providing decoded data for the UE 104 to a data output, and provide decoded control information to a processor 980, or memory 982.

Figure 16:
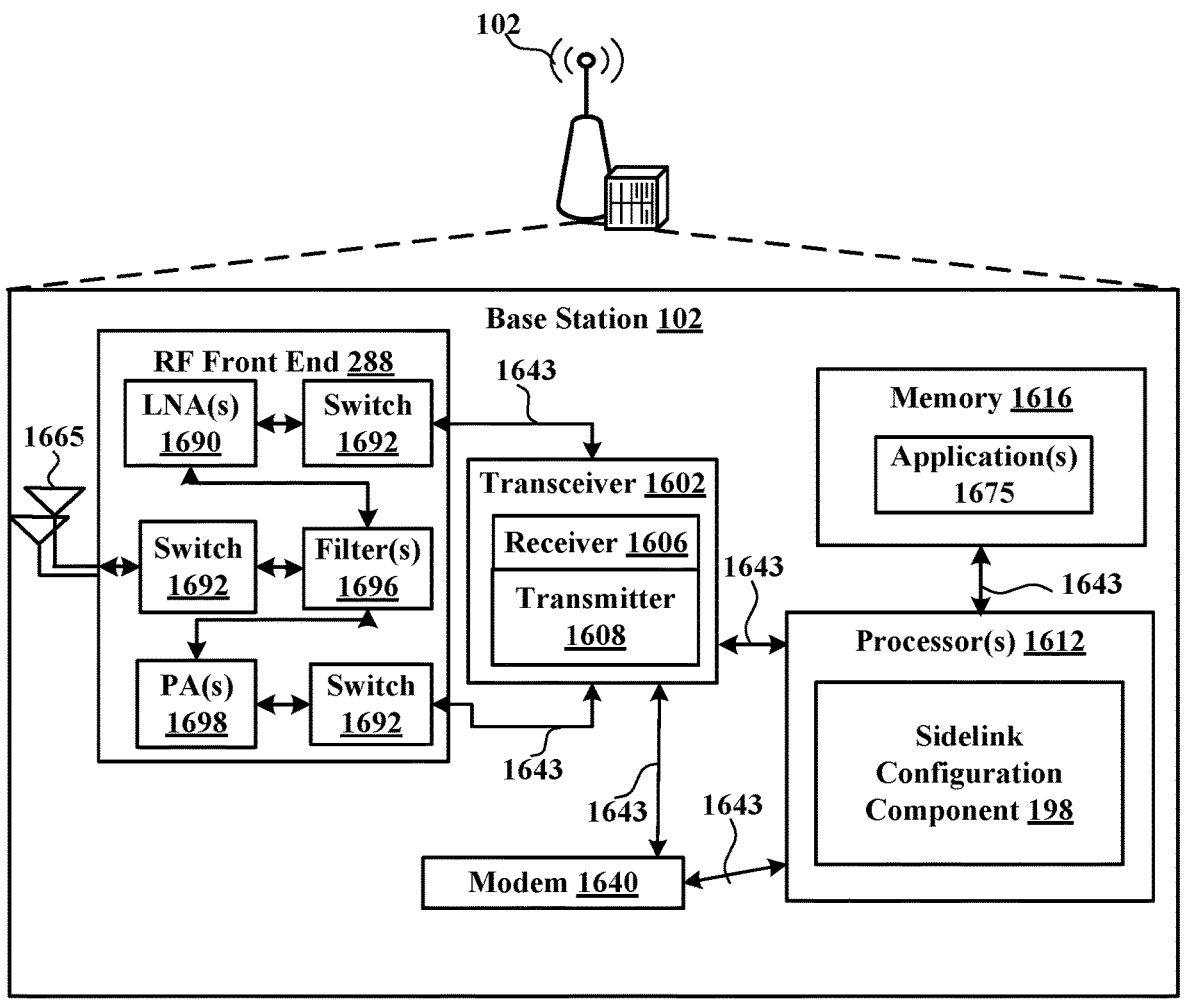
FIG. 16 is a block diagram illustrating an example of a network entity (also referred to as a base station), in accordance with various aspects of the present disclosure.

The processor 480 may in some cases execute stored instructions to instantiate a sidelink configuration component 198 (see e.g., FIGS. 1 and 16).

On the uplink (UL), at the UE 104, a transmit processor 464 may receive and process data from a data source. The transmit processor 464 may also generate reference symbols for a reference signal. The symbols from the transmit processor 464 may be precoded by a transmit MIMO processor 466 if applicable, further processed by the modulator/demodulators 454 and 455 (e.g., for SC-FDMA, etc.), and be transmitted to the base station 102 in accordance with the communication parameters received from the base station 102. At the base station 102, the UL signals from the UE 104 may be received by the antennas 434 and 435, processed by the modulator/demodulators 432 and 433, detected by a MIMO detector 436 if applicable, and further processed by a receive processor 438. The receive processor 438 may provide decoded data to a data output and to the processor 440 or memory 442. The processor 440 may in some cases execute stored instructions to instantiate a sidelink DRX component 140 (see e.g., FIGS. 1 and 17).

The components of the UE 104 may, individually or collectively, be implemented with one or more ASICs adapted to perform some or all of the applicable functions in hardware. Each of the noted modules may be a means for performing one or more functions related to operation of the MIMO communication system 400. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 400.

Figure 5:
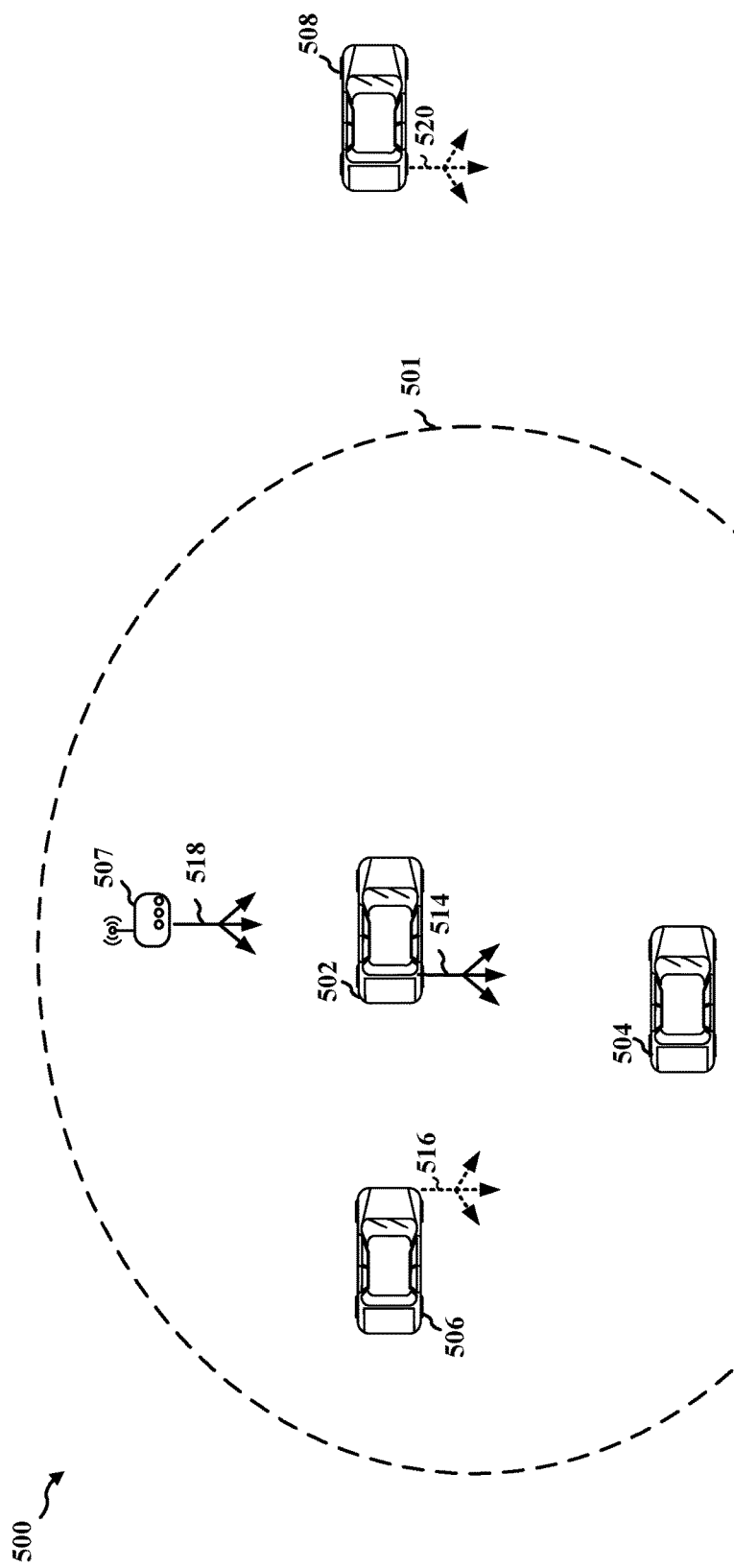
FIG. 5 is an example illustrating wireless communication between devices based on sidelink communication.

FIG. 5 illustrates an example 500 of wireless communication between devices based on sidelink (e.g., V2X/V2V/D2D) communication. The communication may be based on a slot structure comprising aspects described in connection with FIGS. 2 and 3. For example, transmitting UE 502 may transmit a transmission 514, e.g., comprising a control channel and/or a corresponding data channel, that may be received by receiving UEs 504, 506, 508. A control channel may include information for decoding a data channel and may also be used by receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting a transmissions 516, 520. The transmissions 514, 516, 520 may be broadcast or multicast to nearby devices. For example, UE 514 may transmit communication intended for receipt by other UEs within a range 501 of UE 514. Additionally/alternatively, RSU 507 may receive communication from and/or transmit communication to UEs 502, 504, 506, 508.

UE 502, 504, 506, 508 or RSU 507 may comprise a sidelink DRX component 140, similar to 140 described in connection with FIG. 1.

Figure 6:
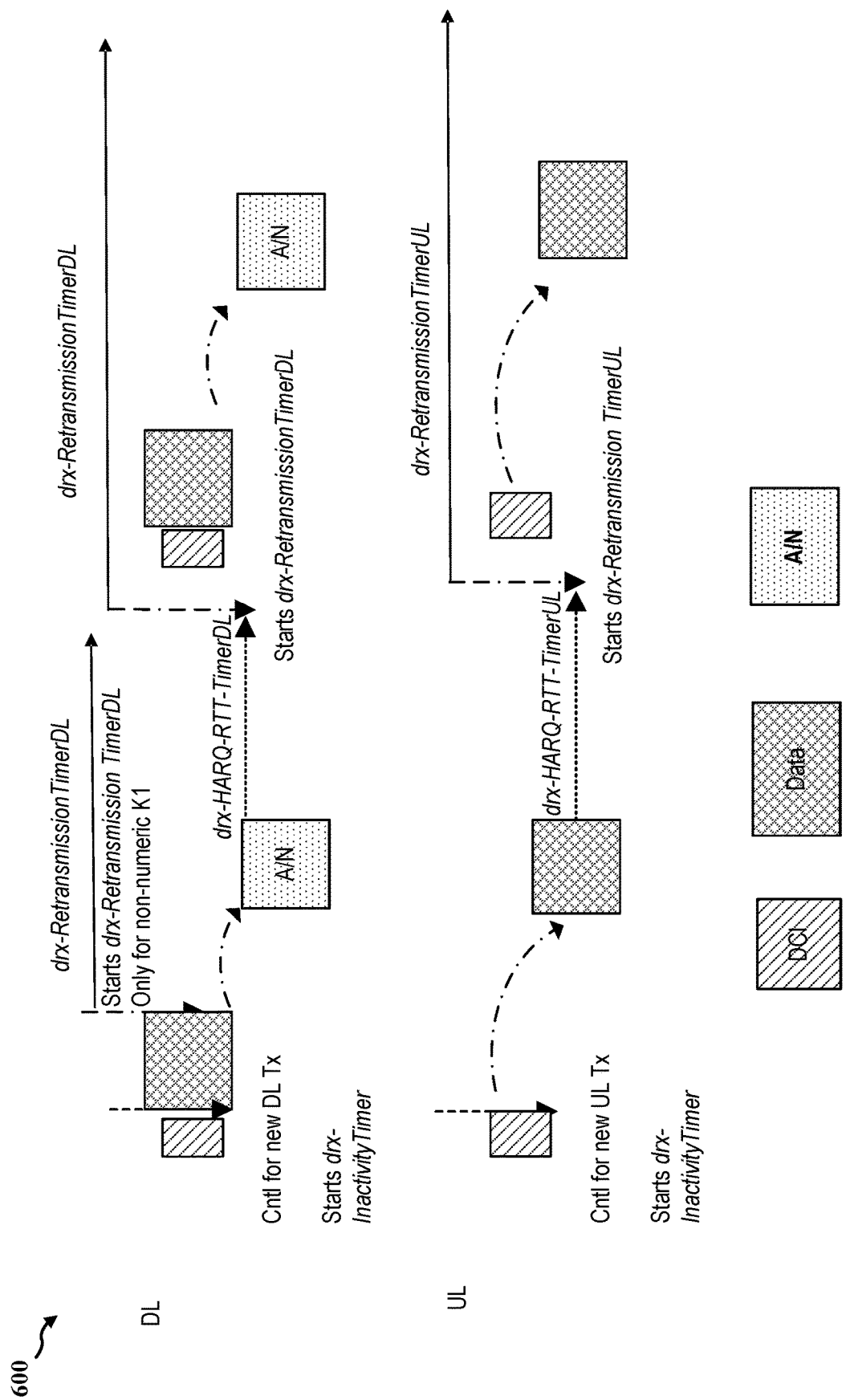
FIG. 6 is a diagram of an example of a discontinuous reception (DRX) procedure for downlink communications and uplink communications, in accordance with various aspects of the present disclosure.

FIG. 6 illustrates an example 600 of a DRX procedure for downlink communications and uplink communications. The communication may be based on a slot structure comprising aspects described in connection with FIGS. 2 and 3. For example, in the downlink (DL), a UE, such as UE 104 of FIG. 1, starts the drx-HARQ-RTT-TimerDL for the corresponding hybrid automatic repeat request (HARQ) process after a HARQ feedback. If a drx-HARQ-RTT-TimerDL expires and data was not successfully decoded, then the UE starts the drx-RetransmissionTimerDL for the corresponding HARQ process after the expiry of drx-HARQ-RTT-TimerDL.

In another example, for the uplink (UL), the UE start the drx-HARQ-RTT-TimerUL for the corresponding HARQ process in the first symbol after the end of the first transmission (within a bundle) of the corresponding PUSCH transmission. If a drx-HARQ-RTT-TimerUL expires, then the UE starts the drx-RetransmissionTimerUL for the corresponding HARQ process in the first symbol after the expiry of drx-HARQ-RTT-TimerUL.

In an aspect, for the NR-U, if the PDSCH-to-HARQ_feedback timing indicates a non-numerical k1 value, the UE starts the drx-RetransmissionTimerDL in the first symbol after the PDSCH transmission for the corresponding HARQ process.

Figure 7:
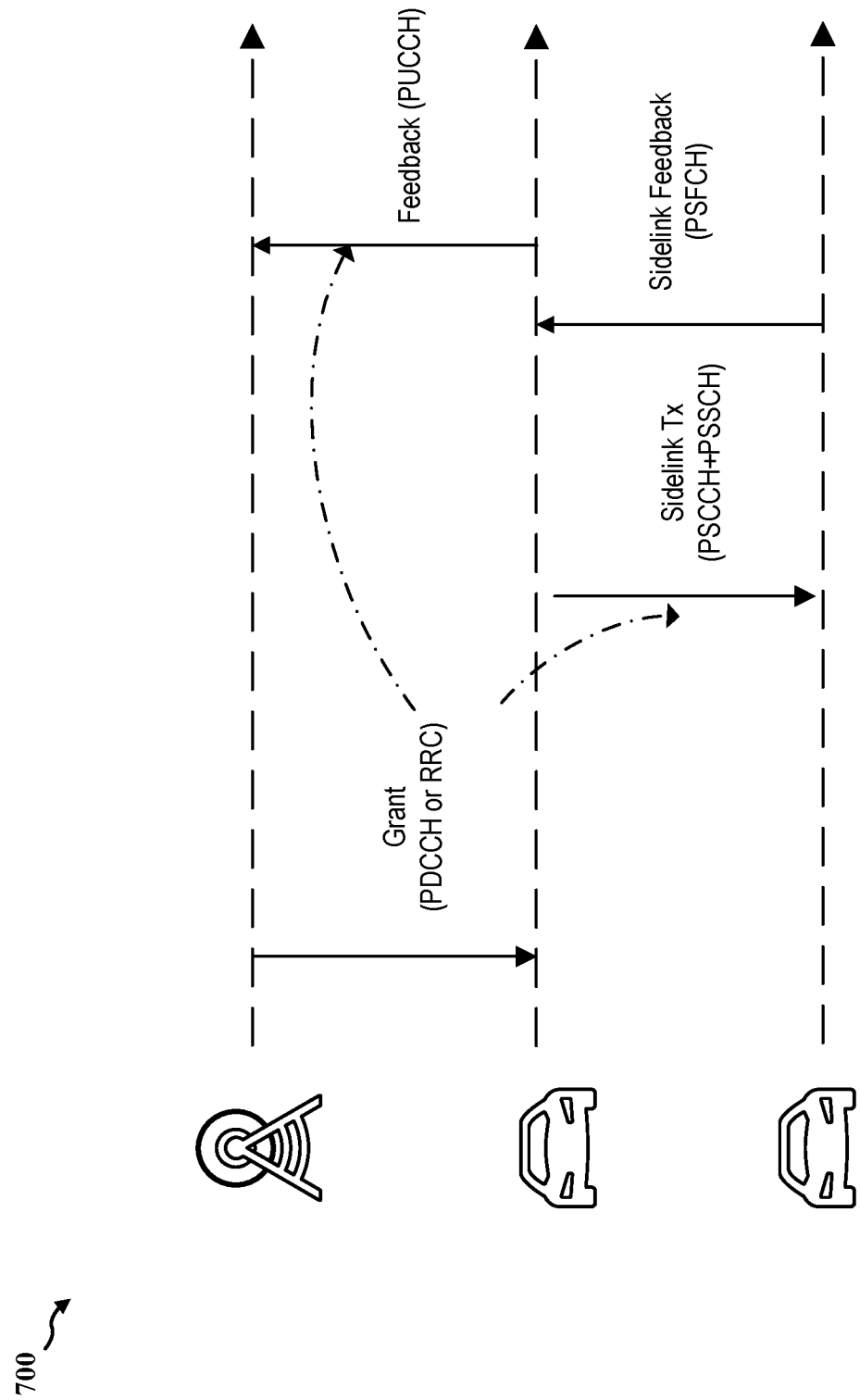
FIG. 7 is a diagram of an example of a DRX procedure for sidelink communications, in accordance with various aspects of the present disclosure.

FIG. 7 is a diagram of an example 700 of a DRX procedure for sidelink communications. The communication may be based on a slot structure comprising aspects described in connection with FIGS. 2 and 3. For example, a UE, such as UE 104 of FIG. 1, may receive a grant, such as a sidelink grant, from base station 102. The sidelink grant may correspond to a DCI3_0. DCI3_0 is like a combined Uu DL and UL grant where it assigns the resources for UE to transmit in SL (similar to Uu UL in this aspect), in addition, it also indicates the resources for UE to transmit the PUCCH (similar to Uu DL in this aspect). In a further example, the drx-Retransmission Timer may be started at the expiration of the drx-HARQ-RTT-Timer.

In an aspect, UE 104 may communicate a sidelink transmission to a second UE, such as UE 104' of FIG. 1. The sidelink transmission may be via PSCCH and PSSCH. In response to the sidelink transmission, the second UE may transmit a sidelink feedback via PSFCH to the first UE which may subsequent transmit a feedback via PUCCH to base station 102.

Figure 8:
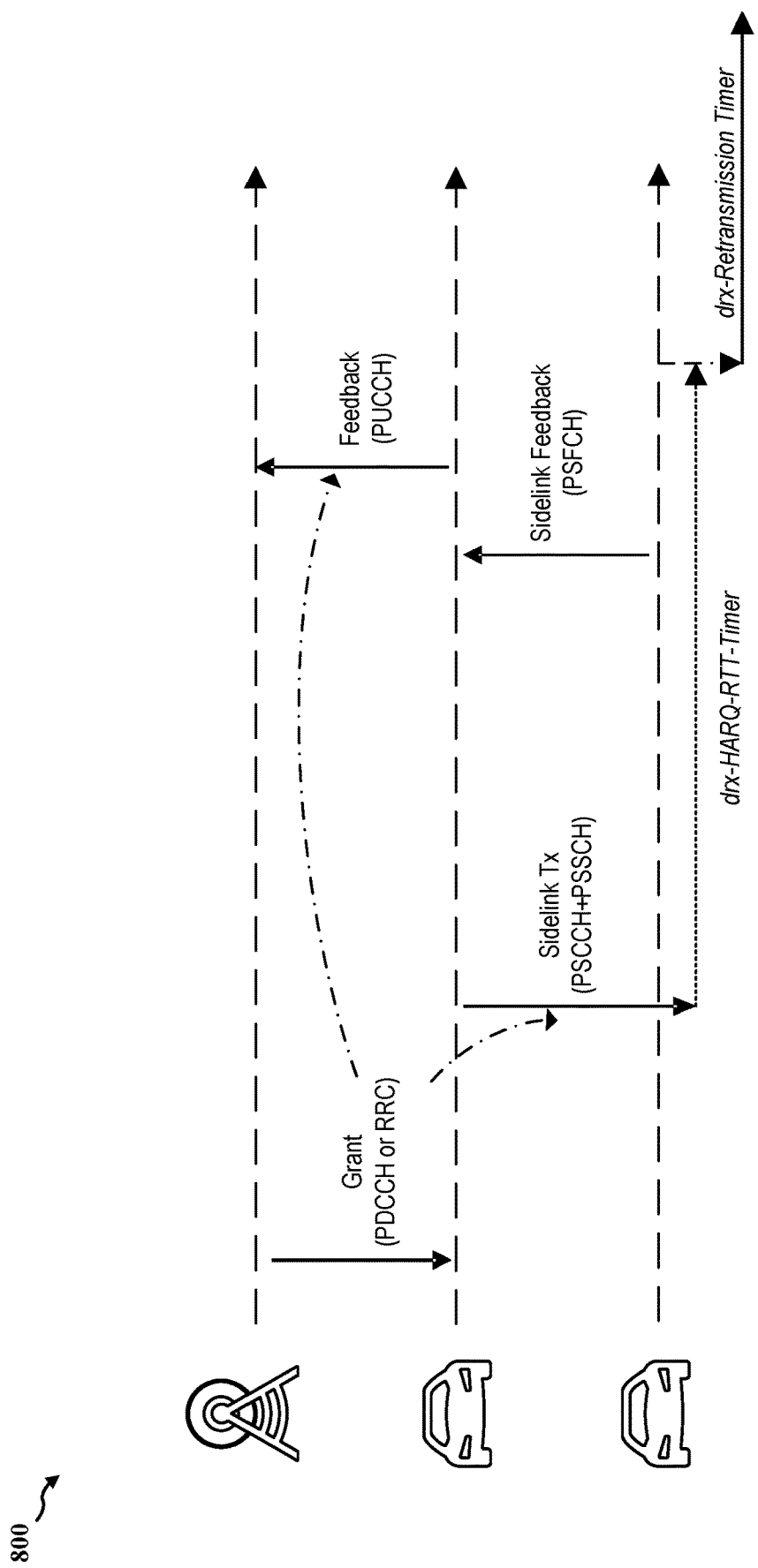
FIG. 8 is a diagram of an example of a DRX procedure for determining the initiation of sidelink round trip timer, in accordance with various aspects of the present disclosure.

FIG. 8 is a diagram of an example 800 of a DRX procedure for determining the initiation of sidelink round trip timer. The communication may be based on a slot structure comprising aspects described in connection with FIGS. 2 and 3. For example, a first UE, such as UE 104 of FIG. 1, may start the drx-HARQ-RTT-Timer for sidelink DRX after a sidelink transmission (e.g., PSSCH transmission). However, the first UE may only be scheduled with a sidelink retransmission resource from gNB after the first UE sends feedback to the network entity, e.g., base station 102 of FIG. 1, consequently the first UE, after receiving the resource allocated by gNB, schedules the SL retransmission to the second UE accordingly.

In addition, when the drx-HARQ-RTT-Timer expires, the first UE initiates the drx-RetransmissionTimer when the packet fails on the sidelink. The first UE determines a packet has failed based on sidelink feedback received from the second UE, i.e., the receiving UE.

In an aspect, a longer drx-HARQ-RTT-Timer (especially with dynamic PUCCH feedback timeline in NR) may be needed to achieve efficient power saving which introduces additional transmission delay on the sidelink.

Figure 9:
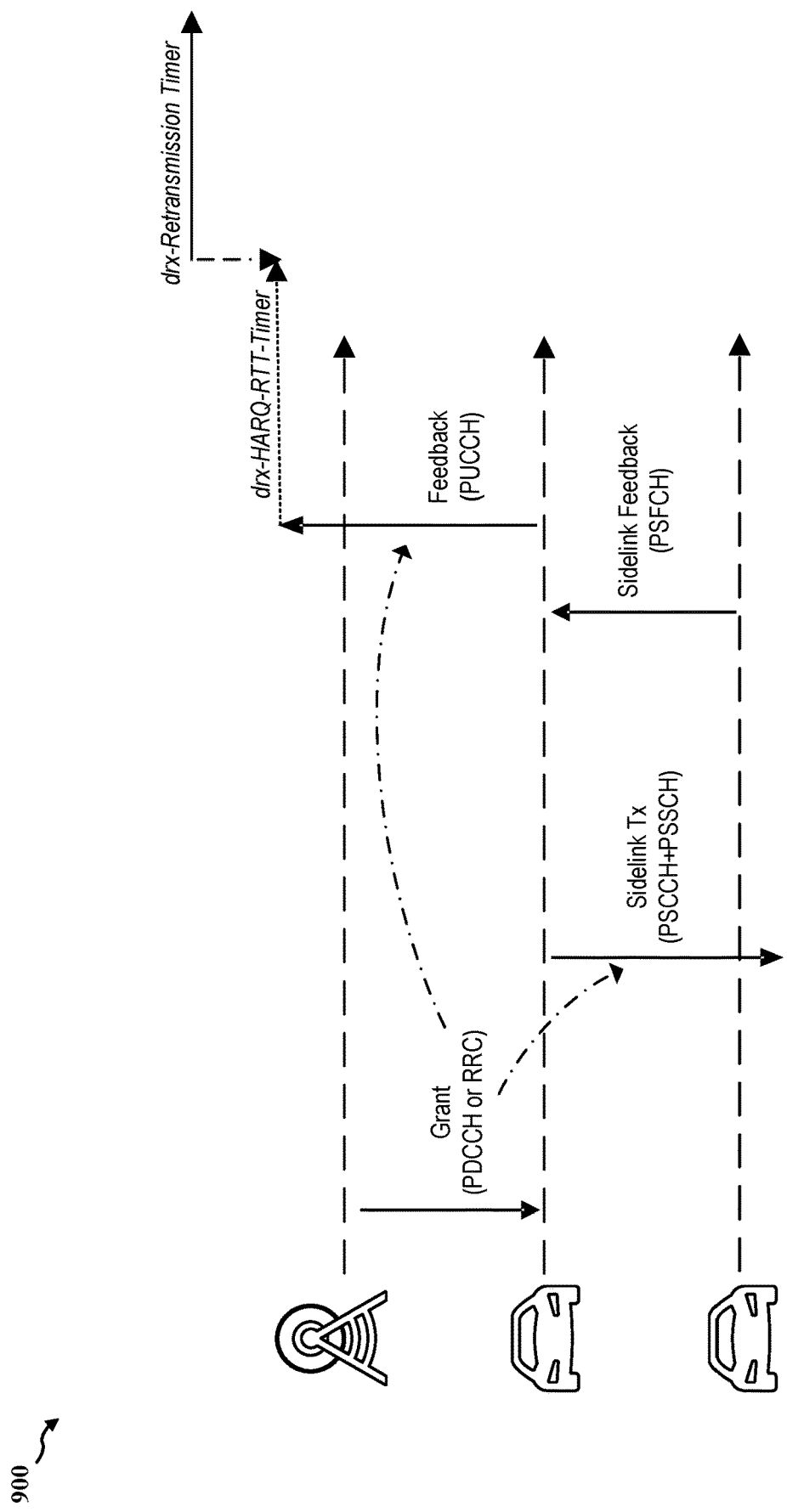
FIG. 9 is a diagram of another example of a DRX procedure for determining the initiation of sidelink round trip timer, in accordance with various aspects of the present disclosure.

FIG. 9 is a diagram of another example 900 of a DRX procedure for determining the initiation of sidelink round trip timer. The communication may be based on a slot structure comprising aspects described in connection with FIGS. 2 and 3. For example, a first UE, such as UE 104 of FIG. 1, starts the drx-HARQ-RTT-Timer for sidelink DRX after communicating PUCCH transmission to the network entity, e.g., base station 102 of FIG. 1. Further, when the drx-HARQ-RTT-Timer expires, the first UE starts drx-Retransmission Timer when PSFCH indicates packet failure.

Figure 10:
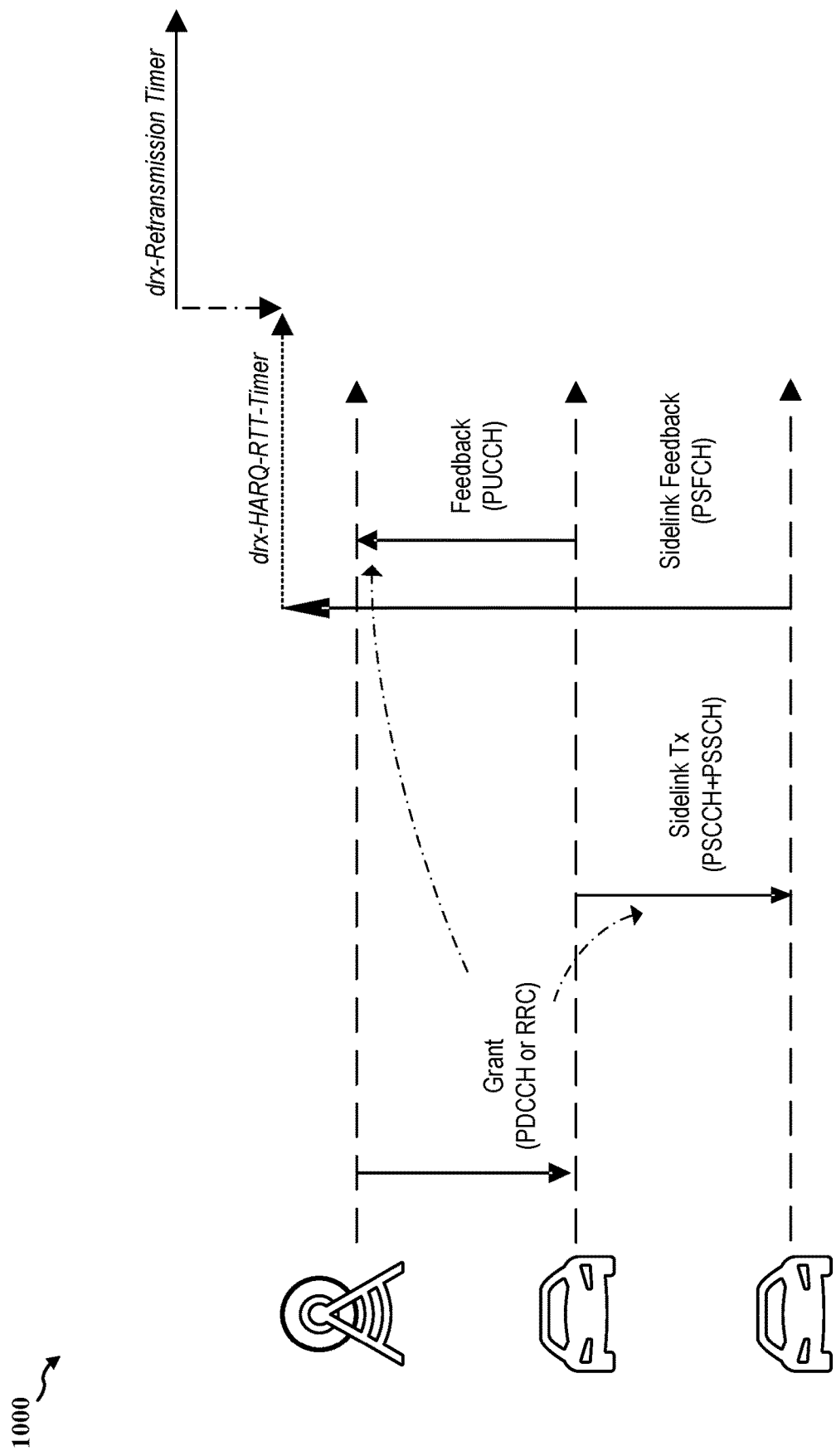
FIG. 10 is a diagram of another example of a DRX procedure for determining the initiation of sidelink round trip timer, in accordance with various aspects of the present disclosure.

FIG. 10 is a diagram of another example 1000 of a DRX procedure for determining the initiation of sidelink round trip timer. The communication may be based on a slot structure comprising aspects described in connection with FIGS. 2 and 3. For example, a first UE, such as UE 104 of FIG. 1, starts the drx-HARQ-RTT-Timer for sidelink DRX after PSFCH transmission. Due to a pre-configured timing relationship between the sidelink transmission and sidelink feedback based on a network entity, such as base station 102 of FIG. 1, indicating the timing between PSFCH and PUCCH in DCI 3_0 (k_1), the network entity is aware when the first UE starts the drx-HARQ-RTT-Timer. In an example, it is possible that the first UE may transmit the data without receiving feedback, however, the timing for the first UE to start drx-HARQ-RTT-Timer is based on the corresponding PSFCH resource even if the second UE does not send PSFCH (i.e., k_1 before the PUCCH resource). Accordingly, the drx-HARQ-RTT-Timer starts later to achieve better power saving.

Figure 11:
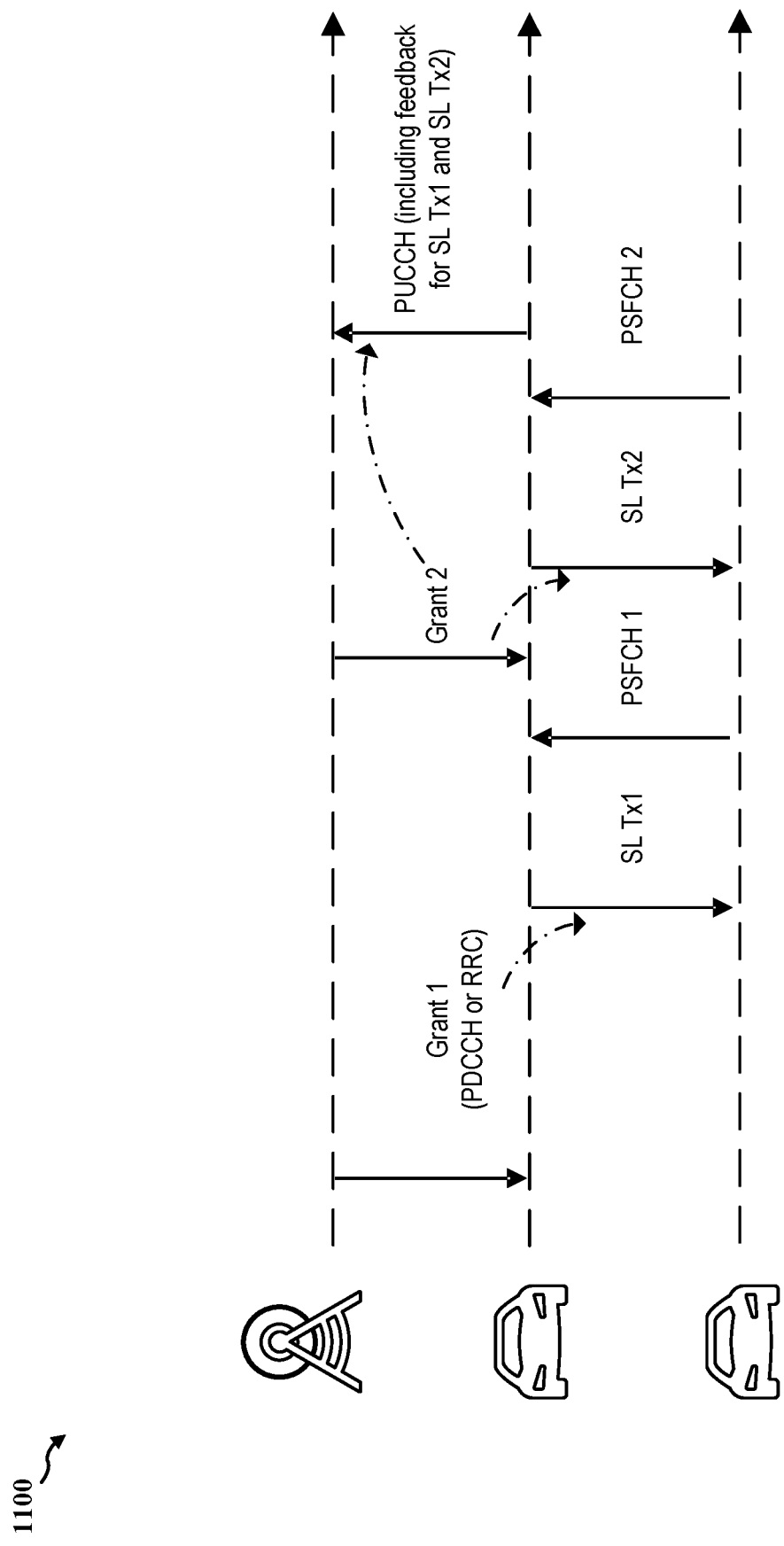
FIG. 11 is a diagram of an example of a DRX procedure for sidelink unlicensed communications, in accordance with various aspects of the present disclosure.

FIG. 11 is a diagram of an example 1100 of a DRX procedure for sidelink unlicensed communications. The communication may be based on a slot structure comprising aspects described in connection with FIGS. 2 and 3. For example, a first UE, such as UE 104 of FIG. 1, may hold on a PUCCH transmission until indicated by a subsequent DCI, as specified by a non-numeric K1. Further, the first UE may be indicated by gNB to transmit PUCCH feedback in a later network entity COT with cat 2 LBT within network entity COT instead of having the first UE perform cat 4 LBT outside network entity COT. For sidelink communications, the gap between grant and the PUCCH feedback is larger due to the 2-hop feedback transmission (e.g., $1^{st}$ hop: PSFCH to Tx, $2^{nd}$ hop: PUCCH to network entity). This larger gap makes the non-numeric K1 behavior more useful.

Figure 12:
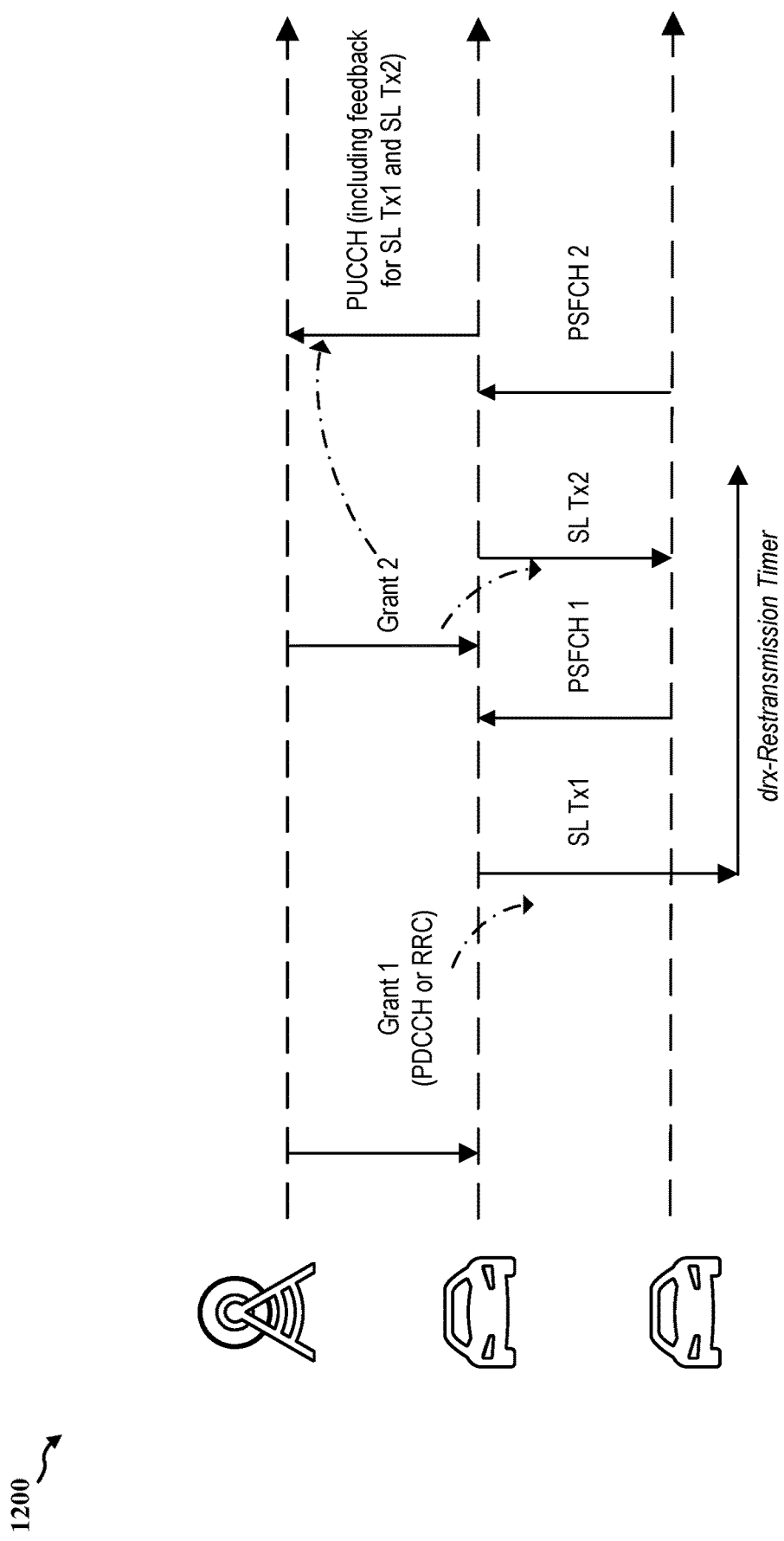
FIG. 12 is a diagram of an example of a DRX procedure for determining the initiation of sidelink retransmission timer, in accordance with various aspects of the present disclosure.

FIG. 12 is a diagram of an example 1200 of a DRX procedure for determining the initiation of sidelink retransmission timer. The communication may be based on a slot structure comprising aspects described in connection with FIGS. 2 and 3. For example, a first UE, such as UE 104 of FIG. 1, starts the drx-RetransmissionTimer for sidelink DRX after PSSCH transmission from the first UE to the second UE. In this example, PUCCH feedback is not necessary for initiation the drx-RetransmissionTimer.

Figure 13:
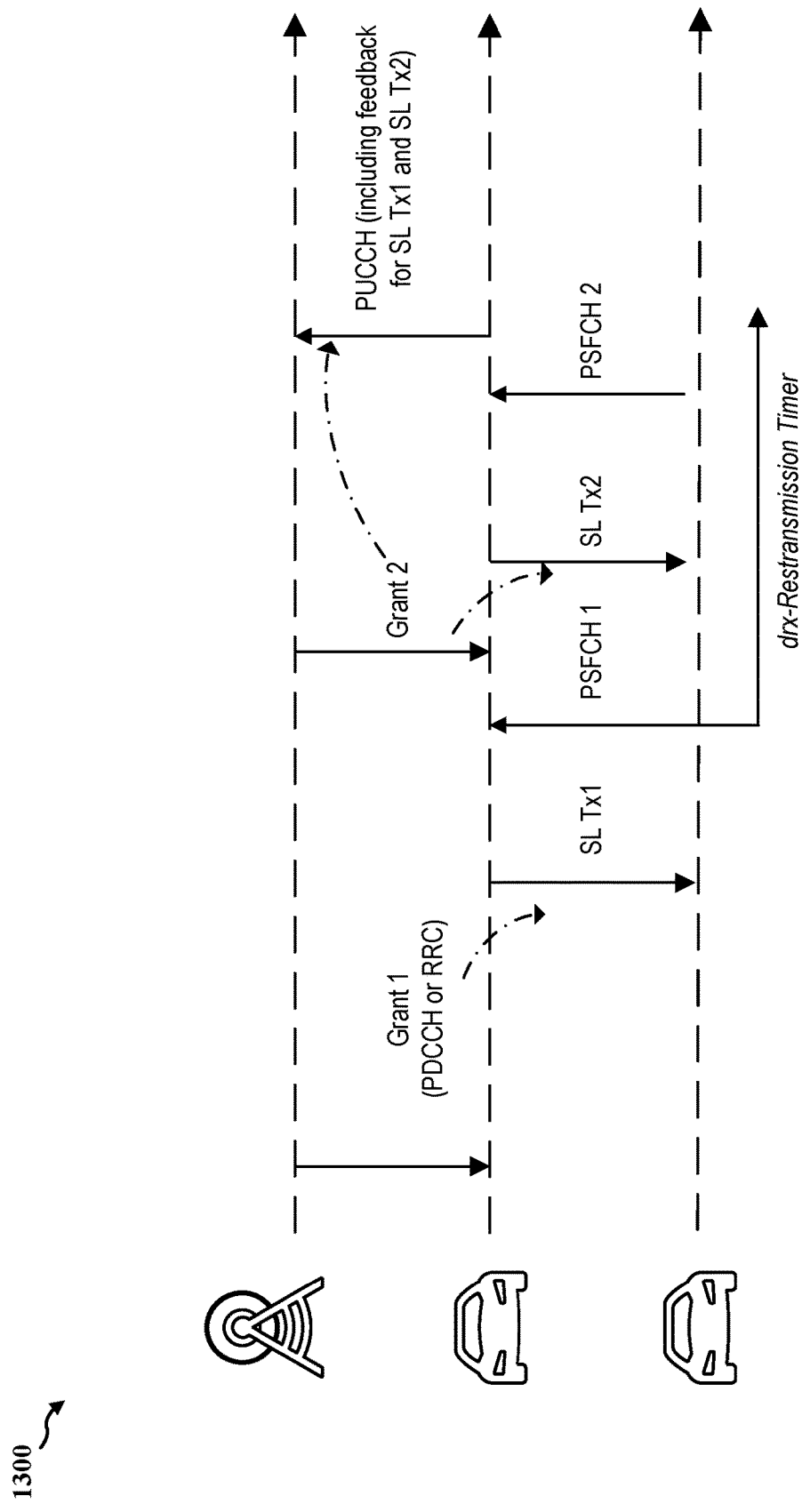
FIG. 13 is a diagram of another example of a DRX procedure for determining the initiation of sidelink retransmission timer, in accordance with various aspects of the present disclosure.

FIG. 13 is a diagram of another example 1300 of a DRX procedure for determining the initiation of sidelink retransmission timer. The communication may be based on a slot structure comprising aspects described in connection with FIGS. 2 and 3. For example, a first UE, such as UE 104 of FIG. 1, starts the drx-RetransmissionTimer for sidelink DRX after PSFCH transmission from the second UE to the first UE in response to the first UE communicating a sidelink transmission to the second UE.

Turning now to FIGS. 14 and 15, aspects are depicted with reference to one or more components and one or more methods that may perform the actions or operations described herein, where aspects in dashed line may be optional. Although the operations described below in FIGS. 14 and 15 are presented in a particular order and/or as being performed by an example component, it should be understood that the ordering of the actions and the components performing the actions may be varied, depending on the implementation. Moreover, it should be understood that the following actions, functions, and/or described components may be performed by reference to one or more components of FIGS. 1, 2, 3, 16 and/or 17, as described herein, a specially-programmed processor, a processor executing specially-programmed software or computer-readable media, or by any other combination of a hardware component and/or a software component capable of performing the described actions or functions.

FIG. 14 illustrates a flow chart of an example of a method 1400 for wireless communication at a network entity, such as the UE 104. In an example, a UE 104 can perform the functions described in method 1400 using one or more of the components described in FIGS. 1, 2, 3, 16 and/or 17.

At block 1402, the method 1400 may receive, from a network entity, a first sidelink grant for a transmission between the first UE and a second UE. In an aspect, the sidelink DRX component 140, e.g., in conjunction with processor(s) 1712, memory 1716, and/or transceiver 1702, may be configured to receive, from a network entity 102, a first sidelink grant for a transmission between the first UE and a second UE. Thus, the UE 104, the processor(s) 1712, the sidelink DRX component 140 or one of its subcomponents may define the means for receiving, from a network entity 102, a first sidelink grant for a transmission between the first UE and a second UE. For example, in an aspect, the UE 104 and/or the sidelink DRX component 140 may receive a signal, process the signal into a sidelink grant, and/or performs other signal processes such as described above with respect to FIG. 17.

At block 1404, the method 1400 may communicate the transmission according to the first sidelink grant to the second UE. In an aspect, the sidelink DRX component 140, e.g., in conjunction with processor(s) 1712, memory 1716, and/or transceiver 1702, may be configured to communicate the transmission according to the first sidelink grant to the second UE 104'. Thus, the UE 104, the processor(s) 1712, the sidelink DRX component 140 or one of its subcomponents may define the means for communicating the transmission according to the first sidelink grant to the second UE 104'. For example, in an aspect, the UE 104 and/or the sidelink DRX component 140 may process the transmission into a signal, transmit the signal, and/or performs other signal processes such as described above with respect to FIG. 17.

At block 1406, the method 1400 may determine initiation of a sidelink round trip timer subsequent to communicating the transmission to the second UE. In an aspect, the sidelink DRX component 140, e.g., in conjunction with processor(s) 1712, memory 1716, and/or transceiver 1702, may be configured to determine initiation of a sidelink round trip timer subsequent to communicating the transmission to the second UE 104'. Thus, the UE 104, the processor(s) 1712, the sidelink DRX component 140 or one of its subcomponents may define the means for determining initiation of a sidelink round trip timer subsequent to communicating the transmission to the second UE 104'. For example, in an aspect, the UE 104 and/or the sidelink DRX component 140 may perform determinations in response to sidelink transmissions, and/or performs other signal processes such as described above with respect to FIG. 17.

At block 1408, the method 1400 may initiate an inactive mode for the first UE based on a second grant not being received from the network entity before completion of a duration of a sidelink retransmission timer that was initiated upon completion of a duration of the sidelink round trip timer, the first UE being configured out of an ON duration of a DRX cycle, and an inactivity timer expiring before completion of the duration of the sidelink retransmission timer. In an aspect, the sidelink DRX component 140, e.g., in conjunction with processor(s) 1712, memory 1716, and/or transceiver 1702, may be configured to initiate an inactive mode for the first UE 104 based on a second grant not being received from the network 102 entity before completion of a duration of a sidelink retransmission timer that was initiated upon completion of a duration of the sidelink round trip timer, the first UE 104 being configured out of an ON duration of a DRX cycle, and an inactivity timer expiring before completion of the duration of the sidelink retransmission timer. Thus, the UE 104, the processor(s) 1712, the sidelink DRX component 140 or one of its subcomponents may define the means for initiating an inactive mode for the first UE based on a second grant not being received from the network entity before completion of a duration of a sidelink retransmission timer that was initiated upon completion of a duration of the sidelink round trip timer, the first UE being configured out of an ON duration of a DRX cycle, and an inactivity timer expiring before completion of the duration of the sidelink retransmission timer. For example, in an aspect, the UE 104 and/or the sidelink DRX component 140 may initiate inactive mode communications, and/or performs other signal processes such as described above with respect to FIG. 17.

In some aspects, determining initiation of the sidelink round trip timer further comprises initiating the sidelink round trip timer upon completion of communicating the transmission to the second UE.

In some aspects, the sidelink DRX component 140, e.g., in conjunction with processor(s) 1712, memory 1716, and/or transceiver 1702, may be configured to receive a feedback signal from the second UE in response to communicating the transmission to the second UE; determine whether the feedback signal corresponds to an indication that the transmission failed to decode; determine whether the sidelink round trip timer has expired; and initiate the sidelink retransmission timer based on a determination that the feedback signal received from the second UE corresponds to the indication that the transmission failed to decode and that the sidelink round trip timer has expired.

In some aspects, the sidelink round trip timer includes an elongated duration configured based on a dynamic feedback timeline between the first UE and the network entity corresponding to communicating a feedback signal from the second UE in response to communicating the transmission from the first UE to the second UE according to the first sidelink grant.

In some aspects, the sidelink DRX component 140, e.g., in conjunction with processor(s) 1712, memory 1716, and/or transceiver 1702, may be configured to receive a first feedback signal from the second UE in response to communicating the transmission to the second UE; establish a feedback resource for communicating a second feedback signal to the network entity 102 in response to receiving the first feedback signal from the second UE 104'; and wherein determining initiation of the sidelink round trip timer further comprises initiating the sidelink round trip timer upon completion of a duration of the feedback resource for communicating the second feedback signal to the network entity 102.

For example, when s1-PUCCH-Config is configured (and the PUCCH is transmitted), the UE 104 should start the SL-specific drx-HARQ-RTT-Timer in Uu for the corresponding SL HARQ process in the first slot after the end of the corresponding transmission carrying the SL HARQ_feedback via the PUCCH. Further, when s1-PUCCH-Config is configured but the PUCCH is not transmitted due to UL/SL prioritization, the TX UE should start the SL-specific drx-HARQ-RTT-Timer in Uu for the corresponding SL HARQ process in the first slot/symbol after the end of the corresponding PUCCH resource. The FFS is on the slot or symbol.

In some aspects, the first feedback signal and the second feedback signal correspond to an indication that the transmission between the first UE and the second UE failed to decode.

In some aspects, the sidelink DRX component 140, e.g., in conjunction with processor(s) 1712, memory 1716, and/or transceiver 1702, may be configured to determine whether the sidelink round trip timer has expired; and initiate the sidelink retransmission timer based on a determination that the first feedback signal received from the second UE corresponds to the indication that the transmission failed to decode and that the sidelink round trip timer has expired.

In some aspects, the sidelink DRX component 140, e.g., in conjunction with processor(s) 1712, memory 1716, and/or transceiver 1702, may be configured to configure a duration for an established period of time between the communication of the transmission from the first UE to the second UE and a communication of a feedback signal from the second UE to the first UE in response to the transmission, and wherein determining initiation of the sidelink round trip timer further comprises automatically initiating the sidelink round trip timer upon expiration of the duration.

In some aspects, initiating the sidelink round trip timer upon expiration of the duration further comprises initiating the sidelink round trip timer without receiving the feedback signal from the second UE.

In some aspects, the duration for the established period of time is based on a corresponding physical sidelink feedback channel (PSFCH) resource.

In some aspects, the first sidelink grant assigns resources for the first UE to communicate the transmission to the second UE and for the UE to transmit a second feedback signal to the network entity.

In some aspects, the second feedback signal is transmitted on a physical uplink control channel (PUCCH) to the network entity.

In some aspects, the sidelink DRX component 140, e.g., in conjunction with processor(s) 1712, memory 1716, and/or transceiver 1702, may be configured to receive a first feedback signal from the second UE via a physical sidelink feedback channel (PSFCH) in response to communicating the transmission.

In some aspects, the transmission corresponds to a sidelink transmission communicated on a physical sidelink control channel (PSCCH) and a physical sidelink shared channel (PSSCH).

In some aspects, the first sidelink grant is received via a physical downlink control channel (PDCCH) or a radio resource control (RRC).

FIG. 15 illustrates a flow chart of an example of a method 1500 for wireless communication at a network entity, such as the UE 104. In an example, a UE 104 can perform the functions described in method 1500 using one or more of the components described in FIGS. 1, 2, 3, 16 and/or 17.

At block 1502, the method 1500 may receive, from a network entity, a first sidelink grant for a transmission between the first UE and a second UE. In an aspect, the sidelink DRX component 140, e.g., in conjunction with processor(s) 1712, memory 1716, and/or transceiver 1702, may be configured to receive, from a network entity 102, a first sidelink grant for a transmission between the first UE and a second UE. Thus, the UE 104, the processor(s) 1712, the sidelink DRX component 140 or one of its subcomponents may define the means for receiving, from a network entity 102, a first sidelink grant for a transmission between the first UE and a second UE. For example, in an aspect, the UE 104 and/or the sidelink DRX component 140 may receive a signal, process the signal into a sidelink grant, and/or performs other signal processes such as described above with respect to FIG. 17.

At block 1504, the method 1500 may communicate the transmission according to the first sidelink grant to the second UE. In an aspect, the sidelink DRX component 140, e.g., in conjunction with processor(s) 1712, memory 1716, and/or transceiver 1702, may be configured to communicate the transmission according to the first sidelink grant to the second UE 104'. Thus, the UE 104, the processor(s) 1712, the sidelink DRX component 140 or one of its subcomponents may define the means for communicating the transmission according to the first sidelink grant to the second UE 104'. For example, in an aspect, the UE 104 and/or the sidelink DRX component 140 may process the transmission into a signal, transmit the signal, and/or performs other signal processes such as described above with respect to FIG. 17.

At block 1506, the method 1500 may determine initiation of a sidelink retransmission timer subsequent to communicating the transmission to the second UE. In an aspect, the sidelink DRX component 140, e.g., in conjunction with processor(s) 1712, memory 1716, and/or transceiver 1702, may be configured to determine initiation of a sidelink retransmission timer subsequent to communicating the transmission to the second UE 104'. Thus, the UE 104, the processor(s) 1712, the sidelink DRX component 140 or one of its subcomponents may define the means for determining initiation of a sidelink retransmission timer subsequent to communicating the transmission to the second UE 104'. For example, in an aspect, the UE 104 and/or the sidelink DRX component 140 may perform determinations, and/or performs other signal processes such as described above with respect to FIG. 17.

At block 1508, the method 1500 may initiate an inactive mode for the first UE based on a second grant not being received from the network entity before completion of a duration of the sidelink retransmission timer. In an aspect, the sidelink DRX component 140, e.g., in conjunction with processor(s) 1712, memory 1716, and/or transceiver 1702, may be configured to initiate an inactive mode for the first UE 104 based on a second grant not being received from the network entity 102 before completion of a duration of the sidelink retransmission timer. Thus, the UE 104, the processor(s) 1712, the sidelink DRX component 140 or one of its subcomponents may define the means for initiating an inactive mode for the first UE 104 based on a second grant not being received from the network entity 102 before completion of a duration of the sidelink retransmission timer. For example, in an aspect, the UE 104 and/or the sidelink DRX component 140 may initiate inactive mode communications, and/or performs other signal processes such as described above with respect to FIG. 17.

In some aspects, determining initiation of the sidelink retransmission timer further comprises initiating the sidelink retransmission timer upon completion of communicating the transmission to the second UE.

In some aspects, the sidelink DRX component 140, e.g., in conjunction with processor(s) 1712, memory 1716, and/or transceiver 1702, may be configured to receive a feedback signal from the second UE in response to communicating the transmission to the second UE, and wherein determining initiation of the sidelink retransmission timer further comprises initiating the sidelink retransmission timer upon reception of the feedback signal from the second UE.

In some aspects, the first sidelink grant assigns resources for the first UE to communicate the transmission to the second UE and for the UE to transmit a second feedback signal to the network entity.

In some aspects, the second feedback signal is transmitted on a physical uplink control channel (PUCCH) to the network entity.

In some aspects, the sidelink DRX component 140, e.g., in conjunction with processor(s) 1712, memory 1716, and/or transceiver 1702, may be configured to receive a first feedback signal from the second UE via a physical sidelink feedback channel (PSFCH) in response to communicating the transmission.

In some aspects, the indication of repetitive scheduling of the downlink control channel corresponds to a DCI. For example, the indication may be transmitted in a DCI to UE 104.

In some aspects, the transmission corresponds to a sidelink transmission communicated on a physical sidelink control channel (PSCCH) and a physical sidelink shared channel (PSSCH).

In some aspects, the first sidelink grant is received via a physical downlink control channel (PDCCH) or a radio resource control (RRC).

Referring to FIG. 16, one example of an implementation of a node acting as an IAB node, such as base station 102 (e.g., a base station 102 and/or gNB 180, as described above) may include a variety of components, some of which have already been described above and are described further herein, including components such as one or more processors 1612 and memory 1616 and transceiver 1602 in communication via one or more buses 1643, which may operate in conjunction with modem 1640 and/or sidelink configuration component 1642 for configuring sidelink communications between a first UE 104 and a second UE 104'.

In an aspect, the one or more processors 1612 can include a modem 1640 and/or can be part of the modem 1640 that uses one or more modem processors. Thus, the various functions related to BS communicating component 1642 may be included in modem 1640 and/or processors 1612 and, in an aspect, can be executed by a single processor, while in other aspects, different ones of the functions may be executed by a combination of two or more different processors. For example, in an aspect, the one or more processors 1612 may include any one or any combination of a modem processor, or a baseband processor, or a digital signal processor, or a transmit processor, or a receiver processor, or a transceiver processor associated with transceiver 1602. In other aspects, some of the features of the one or more processors 1612 and/or modem 1640 associated with BS communicating component 1642 may be performed by transceiver 1602.

Also, memory 1616 may be configured to store data used herein and/or local versions of applications 1675 or BS communicating component 1642 and/or one or more of its subcomponents being executed by at least one processor 1612. Memory 1616 can include any type of computer-readable medium usable by a computer or at least one processor 1612, such as random access memory (RAM), read only memory (ROM), tapes, magnetic discs, optical discs, volatile memory, non-volatile memory, and any combination thereof. In an aspect, for example, memory 1616 may be a non-transitory computer-readable storage medium that stores one or more computer-executable codes defining BS communicating component 1642 and/or one or more of its subcomponents, and/or data associated therewith, when base station 102 is operating at least one processor 1612 to execute sidelink configuration component 1642 and/or one or more of its subcomponents.

Transceiver 1602 may include at least one receiver 1606 and at least one transmitter 1608. Receiver 1606 may include hardware and/or software executable by a processor for receiving data, the code comprising instructions and being stored in a memory (e.g., computer-readable medium). Receiver 1606 may be, for example, a radio frequency (RF) receiver. In an aspect, receiver 1606 may receive signals transmitted by at least one base station 102. Additionally, receiver 1606 may process such received signals, and also may obtain measurements of the signals, such as, but not limited to, Ec/Io, signal-to-noise ratio (SNR), reference signal received power (RSRP), received signal strength indicator (RSSI), etc. Transmitter 1608 may include hardware and/or software executable by a processor for transmitting data, the code comprising instructions and being stored in a memory (e.g., computer-readable medium). A suitable example of transmitter 1608 may including, but is not limited to, an RF transmitter.

Moreover, in an aspect, base station 102 may include RF front end 1688, which may operate in communication with one or more antennas 1665 and transceiver 1602 for receiving and transmitting radio transmissions, for example, wireless communications transmitted by at least one base station 102 or wireless transmissions transmitted by UE 104. RF front end 1688 may be connected to one or more antennas 1665 and can include one or more low-noise amplifiers (LNAs) 1690, one or more switches 1692, one or more power amplifiers (PAs) 1698, and one or more filters 1696 for transmitting and receiving RF signals. The antennas 1665 may include one or more antennas, antenna elements, and/or antenna arrays.

In an aspect, LNA 1690 can amplify a received signal at a desired output level. In an aspect, each LNA 1690 may have a specified minimum and maximum gain values. In an aspect, RF front end 1688 may use one or more switches 1692 to select a particular LNA 1690 and its specified gain value based on a desired gain value for a particular application.

Further, for example, one or more PA(s) 1698 may be used by RF front end 1688 to amplify a signal for an RF output at a desired output power level. In an aspect, each PA 1698 may have specified minimum and maximum gain values. In an aspect, RF front end 1688 may use one or more switches 1692 to select a particular PA 1698 and its specified gain value based on a desired gain value for a particular application.

Also, for example, one or more filters 1696 can be used by RF front end 1688 to filter a received signal to obtain an input RF signal. Similarly, in an aspect, for example, a respective filter 1696 can be used to filter an output from a respective PA 1698 to produce an output signal for transmission. In an aspect, each filter 1696 can be connected to a specific LNA 1690 and/or PA 1698. In an aspect, RF front end 1688 can use one or more switches 1692 to select a transmit or receive path using a specified filter 1696, LNA 1690, and/or PA 1698, based on a configuration as specified by transceiver 1602 and/or processor 1612.

As such, transceiver 1602 may be configured to transmit and receive wireless signals through one or more antennas 1665 via RF front end 1688. In an aspect, transceiver may be tuned to operate at specified frequencies such that UE 104 can communicate with, for example, one or more base stations 102 or one or more cells associated with one or more base stations 102. In an aspect, for example, modem 1640 can configure transceiver 1602 to operate at a specified frequency and power level based on the UE configuration of the UE 104 and the communication protocol used by modem 1640.

In an aspect, modem 1640 can be a multiband-multimode modem, which can process digital data and communicate with transceiver 1602 such that the digital data is sent and received using transceiver 1602. In an aspect, modem 1640 can be multiband and be configured to support multiple frequency bands for a specific communications protocol. In an aspect, modem 1640 can be multimode and be configured to support multiple operating networks and communications protocols. In an aspect, modem 1640 can control one or more components of UE 104 (e.g., RF front end 1688, transceiver 1602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 1612 may correspond to one or more of the processors described in connection with the UE in FIG. 4. Similarly, the memory 1616 may correspond to the memory described in connection with the UE in FIG. 4.

Figure 17:
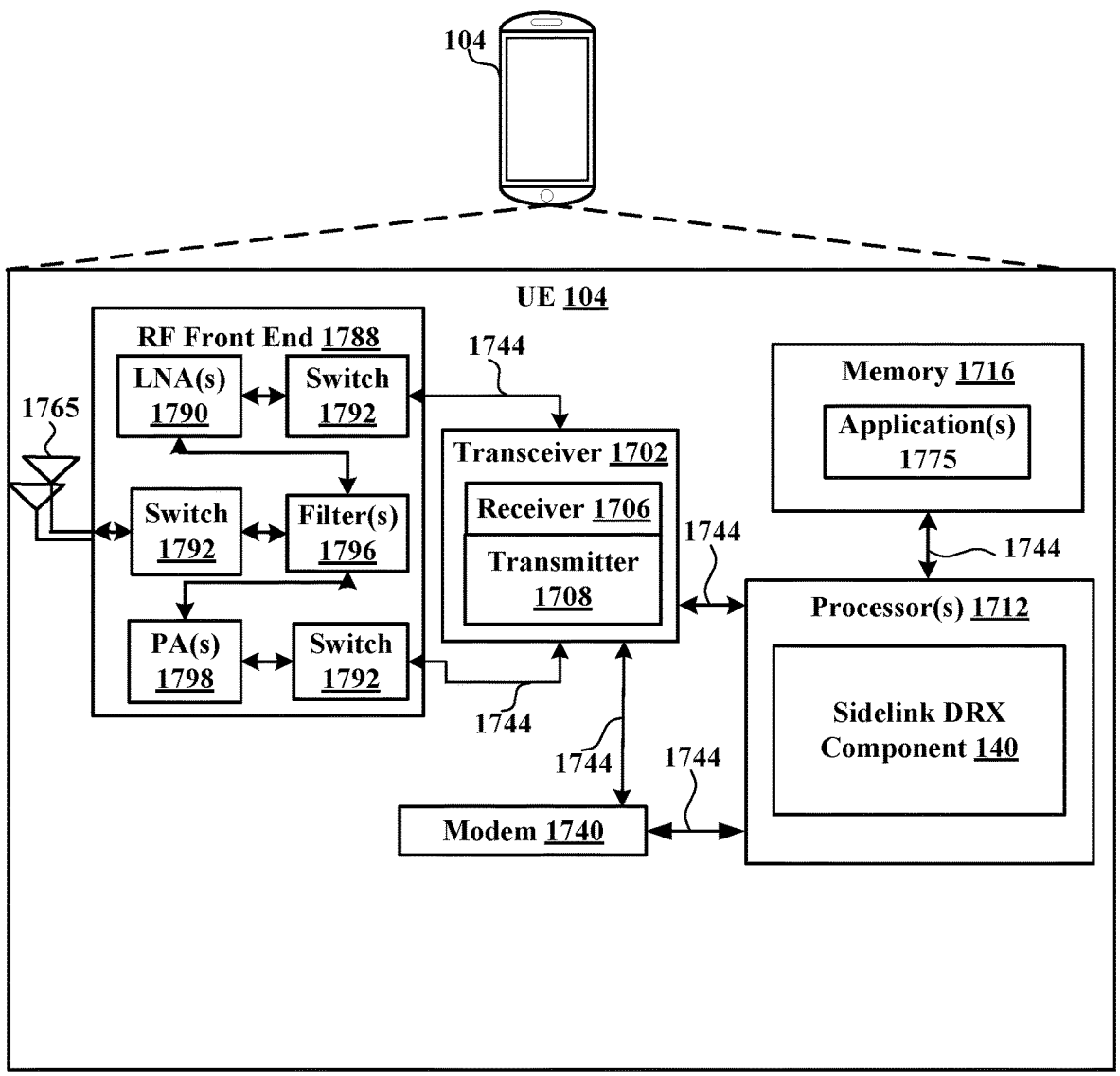
FIG. 17 is a block diagram illustrating an example of a UE, in accordance with various aspects of the present disclosure.

Referring to FIG. 17, one example of an implementation of UE 104 may include a variety of components, some of which have already been described above and are described further herein, including components such as one or more processors 1712 and memory 1716 and transceiver 1702 in communication via one or more buses 1744, which may operate in conjunction with modem 1740 and/or sidelink DRX component 140 for configuring sidelink communications with a second UE 104' based on an indication of repetitive scheduling 254.

The transceiver 1702, receiver 1706, transmitter 1708, one or more processors 1712, memory 1716, applications 1775, buses 1744, RF front end 1788, LNAs 1790, switches 1792, filters 1796, PAs 1798, and one or more antennas 1765 may be the same as or similar to the corresponding components of base station 102, as described above, but configured or otherwise programmed for base station operations as opposed to base station operations.

In an aspect, the processor(s) 1712 may correspond to one or more of the processors described in connection with the base station in FIG. 4. Similarly, the memory 1716 may correspond to the memory described in connection with the base station in FIG. 4.

The following provides an overview of examples of the present disclosure:

Example 1. A method of wireless communication at a first user equipment (UE), comprising: receiving, from a network entity, a first sidelink grant for a transmission between the first UE and a second UE; communicating the transmission according to the first sidelink grant to the second UE; determining initiation of a sidelink round trip timer subsequent to communicating the transmission to the second UE; and initiating an inactive mode for the first UE based on a second grant not being received from the network entity before completion of a duration of a sidelink retransmission timer that was initiated upon completion of a duration of the sidelink round trip timer, the first UE being configured out of an ON duration of a discontinuous reception (DRX) cycle, and an inactivity timer expiring before completion of the duration of the sidelink retransmission timer.

Example 2. The method of example 1, wherein determining initiation of the sidelink round trip timer further comprises initiating the sidelink round trip timer upon completion of communicating the transmission to the second UE.

Example 3. The method of examples 1 and 2, further comprising: receiving a feedback signal from the second UE in response to communicating the transmission to the second UE; determining whether the feedback signal corresponds to an indication that the transmission failed to decode; determining whether the sidelink round trip timer has expired; and initiating the sidelink retransmission timer based on a determination that the feedback signal received from the second UE corresponds to the indication that the transmission failed to decode and that the sidelink round trip timer has expired.

Example 4. The method of examples 1 and 2, wherein the sidelink round trip timer includes an elongated duration configured based on a dynamic feedback timeline between the first UE and the network entity corresponding to communicating a feedback signal from the second UE in response to communicating the transmission from the first UE to the second UE according to the first sidelink grant.

Example 5. The method of example 1, further comprising: receiving a first feedback signal from the second UE in response to communicating the transmission to the second UE; establishing a feedback resource for communicating a second feedback signal to the network entity in response to receiving the first feedback signal from the second UE; and wherein determining initiation of the sidelink round trip timer further comprises initiating the sidelink round trip timer upon completion of a duration of the feedback resource for communicating the second feedback signal to the network entity.

Example 6. The method of examples 1 and 5, wherein the first feedback signal and the second feedback signal correspond to an indication that the transmission between the first UE and the second UE failed to decode.

Example 7. The method of examples 1 and 6, further comprising: determining whether the sidelink round trip timer has expired; and initiating the sidelink retransmission timer based on a determination that the first feedback signal received from the second UE corresponds to the indication that the transmission failed to decode and that the sidelink round trip timer has expired.

Example 8. The method of example 1, further comprising configuring a duration for an established period of time between the communication of the transmission from the first UE to the second UE and a communication of a feedback signal from the second UE to the first UE in response to the transmission, and wherein determining initiation of the sidelink round trip timer further comprises automatically initiating the sidelink round trip timer upon expiration of the duration.

Example 9. The method of examples 1 and 8, wherein initiating the sidelink round trip timer upon expiration of the duration further comprises initiating the sidelink round trip timer without receiving the feedback signal from the second UE.

Example 10. The method of examples 1 and 8, wherein the duration for the established period of time is based on a corresponding physical sidelink feedback channel (PSFCH) resource.

Example 11. The method of example 1, wherein the first sidelink grant assigns resources for the first UE to communicate the transmission to the second UE and for the UE to transmit a second feedback signal to the network entity.

Example 12. The method of examples 1 and 11, wherein the second feedback signal is transmitted on a physical uplink control channel (PUCCH) to the network entity.

Example 13. The method of examples 1 and 11, further comprising receiving a first feedback signal from the second UE via a physical sidelink feedback channel (PSFCH) in response to communicating the transmission.

Example 14. The method of example 1, wherein the transmission corresponds to a sidelink transmission communicated on a physical sidelink control channel (PSCCH) and a physical sidelink shared channel (PSSCH).

Example 15. The method of example 1, wherein the first sidelink grant is received via a physical downlink control channel (PDCCH) or a radio resource control (RRC).

Example 16. A method of wireless communication at a first user equipment (UE), comprising: receiving, from a network entity, a first sidelink grant for a transmission between the first UE and a second UE; communicating the transmission according to the first sidelink grant to the second UE; determining initiation of a sidelink retransmission timer subsequent to communicating the transmission to the second UE; and initiating an inactive mode for the first UE based on a second grant not being received from the network entity before completion of a duration of the sidelink retransmission timer.

Example 17. The method of example 16, wherein determining initiation of the sidelink retransmission timer further comprises initiating the sidelink retransmission timer upon completion of communicating the transmission to the second UE.

Example 18. The method of example 16, further comprising receiving a feedback signal from the second UE in response to communicating the transmission to the second UE, and wherein determining initiation of the sidelink retransmission timer further comprises initiating the sidelink retransmission timer upon reception of the feedback signal from the second UE.

Example 19. The method of example 16, wherein the first sidelink grant assigns resources for the first UE to communicate the transmission to the second UE and for the UE to transmit a second feedback signal to the network entity.

Example 20. The method of examples 16 and 19, wherein the second feedback signal is transmitted on a physical uplink control channel (PUCCH) to the network entity.

Example 21. The method of examples 16 and 19, further comprising receiving a first feedback signal from the second UE via a physical sidelink feedback channel (PSFCH) in response to communicating the transmission.

Example 22. The method of example 16, wherein the transmission corresponds to a sidelink transmission communicated on a physical sidelink control channel (PSCCH) and a physical sidelink shared channel (PSSCH).

Example 23. The method of example 16, wherein the first sidelink grant is received via a physical downlink control channel (PDCCH) or a radio resource control (RRC).

Example 24. An apparatus for wireless communication at a first user equipment (UE), comprising: a transceiver; a memory configured to store instructions; and one or more processors communicatively coupled with the transceiver and the memory, wherein the one or more processors are configured to execute the instructions to: receive, from a network entity, a first sidelink grant for a transmission between the first UE and a second UE; communicate the transmission according to the first sidelink grant to the second UE; determine initiation of a sidelink round trip timer subsequent to communicating the transmission to the second UE; and initiate an inactive mode for the first UE based on a second grant not being received from the network entity before completion of a duration of a sidelink retransmission timer that was initiated upon completion of a duration of the sidelink round trip timer, the first UE being configured out of an ON duration of a discontinuous reception (DRX) cycle, and an inactivity timer expiring before completion of the duration of the sidelink retransmission timer.

Example 25. The apparatus of example 24, wherein the one or more processors configured to determine initiation of the sidelink round trip timer is further configured to initiate the sidelink round trip timer upon completion of communicating the transmission to the second UE.

Example 26. The apparatus of example 24, wherein the one or more processors are configured to: receive a first feedback signal from the second UE in response to communicating the transmission to the second UE; establish a feedback resource for communicating a second feedback signal to the network entity in response to receiving the first feedback signal from the second UE; and wherein determining initiation of the sidelink round trip timer further comprises initiating the sidelink round trip timer upon completion of a duration of the feedback resource for communicating the second feedback signal to the network entity.

Example 27. The apparatus of example 24, wherein the one or more processors are configured to configure a duration for an established period of time between the communication of the transmission from the first UE to the second UE and a communication of a feedback signal from the second UE to the first UE in response to the transmission, and wherein determining initiation of the sidelink round trip timer further comprises automatically initiating the sidelink round trip timer upon expiration of the duration.

Example 28. An apparatus for wireless communication at a first user equipment (UE), comprising: a transceiver; a memory configured to store instructions; and one or more processors communicatively coupled with the transceiver and the memory, wherein the one or more processors are configured to execute the instructions to: receive, from a network entity, a first sidelink grant for a transmission between the first UE and a second UE; communicate the transmission according to the first sidelink grant to the second UE; determine initiation of a sidelink retransmission timer subsequent to communicating the transmission to the second UE; and initiate an inactive mode for the first UE based on a second grant not being received from the network entity before completion of a duration of the sidelink retransmission timer.

Example 29. The apparatus of example 28, wherein the one or more processors configured to determine initiation of the sidelink retransmission timer are further configured to initiate the sidelink retransmission timer upon completion of communicating the transmission to the second UE.

Example 30. The apparatus of example 28, wherein the one or more processors are configured to receive a feedback signal from the second UE in response to communicating the transmission to the second UE, and wherein determining initiation of the sidelink retransmission timer further comprises initiating the sidelink retransmission timer upon reception of the feedback signal from the second UE.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a first user equipment (UE), the method comprising:
   receiving, from a network entity, a first sidelink grant for a transmission between the first UE and a second UE;
   communicating the transmission according to the first sidelink grant to the second UE;
   determining initiation of a sidelink round trip timer subsequent to communicating the transmission to the second UE;
   initiating an inactive mode for the first UE based on a second grant not being received from the network entity before completion of a duration of a sidelink retransmission timer that was initiated upon completion of a duration of the sidelink round trip timer, the first UE being configured out of an ON duration of a discontinuous reception (DRX) cycle, and an inactivity timer expiring before completion of the duration of the sidelink retransmission timer;
   receiving a first feedback signal from the second UE in response to communicating the transmission to the second UE; and
   establishing a feedback resource for communicating a second feedback signal to the network entity in response to receiving the first feedback signal from the second UE; and
   wherein determining the initiation of the sidelink round trip timer further comprises initiating the sidelink round trip timer upon the completion of a duration of the feedback resource for communicating the second feedback signal to the network entity.

2. The method of claim 1, wherein determining the initiation of the sidelink round trip timer further comprises initiating the sidelink round trip timer upon the completion of communicating the transmission to the second UE.

3. The method of claim 2, further comprising:
   receiving a feedback signal from the second UE in response to communicating the transmission to the second UE;
   determining whether the feedback signal corresponds to an indication that the transmission failed to decode;
   determining whether the sidelink round trip timer has expired; and
   initiating the sidelink retransmission timer based on a determination that the feedback signal received from the second UE corresponds to the indication that the transmission failed to decode and that the sidelink round trip timer has expired.

4. The method of claim 2, wherein the sidelink round trip timer includes an elongated duration configured based on a dynamic feedback timeline between the first UE and the network entity corresponding to communicating a feedback signal from the second UE in response to communicating the transmission from the first UE to the second UE according to the first sidelink grant.

5. The method of claim 1, wherein the first feedback signal and the second feedback signal correspond to an indication that the transmission between the first UE and the second UE failed to decode.

6. The method of claim 5, further comprising:
determining whether the sidelink round trip timer has expired; and
initiating the sidelink retransmission timer based on a determination that the first feedback signal received from the second UE corresponds to the indication that the transmission failed to decode and that the sidelink round trip timer has expired.

7. The method of claim 1, further comprising configuring a duration for an established period of time between the communication of the transmission from the first UE to the second UE and a communication of a feedback signal from the second UE to the first UE in response to the transmission, and
wherein determining the initiation of the sidelink round trip timer further comprises automatically initiating the sidelink round trip timer upon expiration of the duration.

8. The method of claim 7, wherein initiating the sidelink round trip timer upon the expiration of the duration further comprises initiating the sidelink round trip timer without receiving the feedback signal from the second UE.

9. The method of claim 7, wherein the duration for the established period of time is based on a corresponding physical sidelink feedback channel (PSFCH) resource.

10. The method of claim 1, wherein the first sidelink grant assigns resources for the first UE to communicate the transmission to the second UE and for the first UE to transmit a second feedback signal to the network entity.

11. The method of claim 10, wherein the second feedback signal is transmitted on a physical uplink control channel (PUCCH) to the network entity.

12. The method of claim 10, further comprising receiving a first feedback signal from the second UE via a physical sidelink feedback channel (PSFCH) in response to communicating the transmission.

13. The method of claim 1, wherein the transmission corresponds to a sidelink transmission communicated on a physical sidelink control channel (PSCCH) and a physical sidelink shared channel (PSSCH).

14. The method of claim 1, wherein the first sidelink grant is received via a physical downlink control channel (PDCCH) or a radio resource control (RRC).

15. An apparatus for wireless communication at a first user equipment (UE), the apparatus comprising:
a transceiver;
a memory configured to store instructions; and
one or more processors communicatively coupled with the transceiver and the memory, wherein the one or more processors are configured to execute the instructions to:
receive, from a network entity, a first sidelink grant for a transmission between the first UE and a second UE;
communicate the transmission according to the first sidelink grant to the second UE;
determine initiation of a sidelink round trip timer subsequent to communicating the transmission to the second UE;
initiate an inactive mode for the first UE based on a second grant not being received from the network entity before completion of a duration of a sidelink retransmission timer that was initiated upon completion of a duration of the sidelink round trip timer, the first UE being configured out of an ON duration of a discontinuous reception (DRX) cycle, and an inactivity timer expiring before completion of the duration of the sidelink retransmission timer;
receive a first feedback signal from the second UE in response to communicating the transmission to the second UE; and
establishing a feedback resource for communicating a second feedback signal to the network entity in response to receiving the first feedback signal from the second UE; and
wherein determining initiation of the sidelink round trip timer further comprises initiating the sidelink round trip timer upon completion of a duration of the feedback resource for communicating the second feedback signal to the network entity.

16. The apparatus of claim 15, wherein the one or more processors configured to determine the initiation of the sidelink round trip timer is further configured to initiate the sidelink round trip timer upon the completion of communicating the transmission to the second UE.

17. The apparatus of claim 16, wherein the sidelink round trip timer includes an elongated duration configured based on a dynamic feedback timeline between the first UE and the network entity corresponding to communicating a feedback signal from the second UE in response to communicating the transmission from the first UE to the second UE according to the first sidelink grant.

18. The apparatus of claim 15, wherein the one or more processors are configured to configure a duration for an established period of time between the communication of the transmission from the first UE to the second UE and a communication of a feedback signal from the second UE to the first UE in response to the transmission, and
wherein determining initiation of the sidelink round trip timer further comprises automatically initiating the sidelink round trip timer upon expiration of the duration.

19. The apparatus of claim 18, wherein the one or more processors configured to initiate the sidelink round trip timer upon the expiration of the duration are further configured to initiate the sidelink round trip timer without receiving the feedback signal from the second UE.

20. The apparatus of claim 18, wherein the duration for the established period of time is based on a corresponding physical sidelink feedback channel (PSFCH) resource.

21. The apparatus of claim 15, wherein the one or more processors are configured:
receive a first feedback signal from the second UE in response to communicating the transmission to the second UE;
establish a feedback resource for communicating a second feedback signal to the network entity in response to receiving the first feedback signal from the second UE; and
wherein the one or more processors configured to determine the initiation of the sidelink round trip timer are further configured to initiate the sidelink round trip timer upon the completion of a duration of the feedback resource for communicating the second feedback signal to the network entity.

22. The apparatus of claim 21, wherein the first feedback signal and the second feedback signal correspond to an indication that the transmission between the first UE and the second UE failed to decode.

23. The apparatus of claim 22, wherein the one or more processors are configured:
   determine whether the sidelink round trip timer has expired; and
   initiate the sidelink retransmission timer based on a determination that the first feedback signal received from the second UE corresponds to the indication that the transmission failed to decode and that the sidelink round trip timer has expired.

24. The apparatus of claim 15, wherein the first sidelink grant assigns resources for the first UE to communicate the transmission to the second UE and for the first UE to transmit a second feedback signal to the network entity.

25. The apparatus of claim 24, wherein the second feedback signal is transmitted on a physical uplink control channel (PUCCH) to the network entity.

26. The apparatus of claim 24, wherein the one or more processors are configured to receive a first feedback signal from the second UE via a physical sidelink feedback channel (PSFCH) in response to communicating the transmission.

27. The apparatus of claim 15, wherein the transmission corresponds to a sidelink transmission communicated on a physical sidelink control channel (PSCCH) and a physical sidelink shared channel (PSSCH).

28. The apparatus of claim 15, wherein the first sidelink grant is received via a physical downlink control channel (PDCCH) or a radio resource control (RRC).

* * * * *